Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 1

INVENTORS.
BEN A. HARRIS

BY Geo. J. Seligsohn

ATTORNEY

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 2

BUSY MARKING MEANS FOR AUTOMATIC TOLL TICKETING SYSTEM

Filed Sept. 21, 1956 14 Sheets-Sheet 3

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 4

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 6

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 7

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 9

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 11

Dec. 8, 1959 B. A. HARRIS 2,916,551

BUSY MARKING MEANS FOR AUTOMATIC TOLL TICKETING SYSTEM

Filed Sept. 21, 1956 14 Sheets-Sheet 12

BUSY MARKING MEANS FOR AUTOMATIC TOLL TICKETING SYSTEM

BUSY MARKING MEANS FOR AUTOMATIC TOLL TICKETING SYSTEM

Filed Sept. 21, 1956 14 Sheets-Sheet 14

United States Patent Office 2,916,551

Patented Dec. 8, 1959

2,916,551

BUSY MARKING MEANS FOR AUTOMATIC TOLL TICKETING SYSTEM

Ben A. Harris, Rochester, N.Y., assignor to General Dynamics Corporation, Rochester, N.Y., a corporation of Delaware Application September 21, 1956, Serial No. 611,302

4 Claims. (Cl. 179—8)

Figure 1:
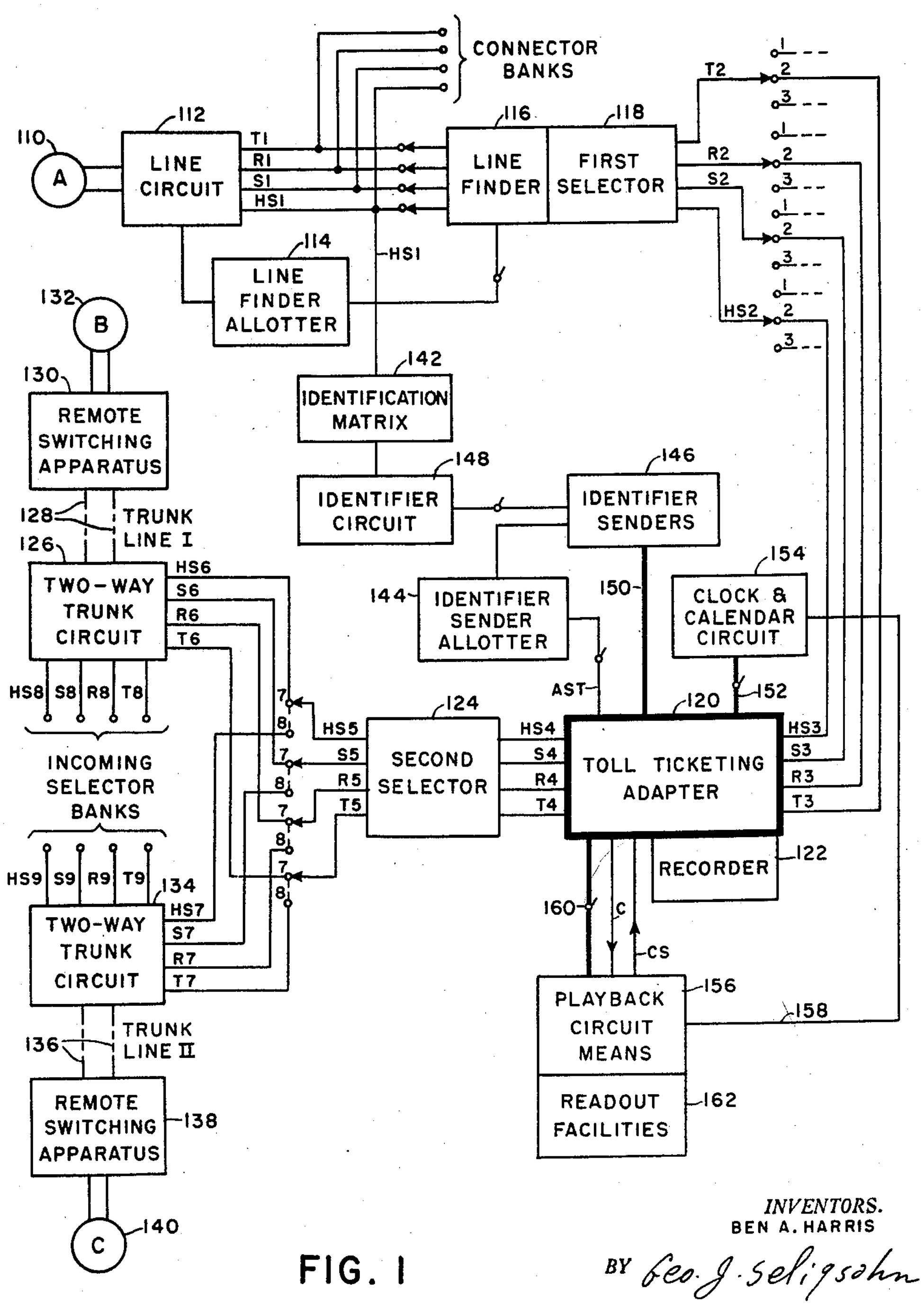

This invention relates to busy marking means for automatic toll ticketing system and, more particularly, to a busy marking means for automatic toll ticketing system employing multi-access trunk circuits.

The system described herein is basically similar to the automatic toll ticketing system shown and described in the copending application of M. A. Clement and B. A. Harris, Serial No. 536,579, filed September 26, 1955, which application is assigned to the same assignee as the present application, in that items of billing information pertaining to a plurality of successively placed toll calls are automatically recorded in the recorder employing an elongated record medium, and thereafter the elongated medium is played back to produce individual toll tickets from the recorded billing information pertaining to toll calls.

However, the automatic toll ticketing system described herein differs from the system described in the copending above-identified application of Clement and Harris in that it utilizes a multi-access trunk circuit, such as a two-way trunk circuit or a trunk circuit which has access to an operator's position as well as to the automatic toll ticketing circuitry. Since this trunk circuit may be busy with a call associated with a second of its points of access at a time when it is attempted to seize the toll ticketing circuitry associated with the trunk circuit over a first of its points of access, it is essential that the toll ticketing circuitry be marked busy when the trunk circuit with which it is associated is busy. Furthermore, the toll ticketing circuitry must be marked busy during the period when the elongated medium is being played back. However, during this play back period, it is desirable that the trunk circuit be free to accept calls over its second point of access.

The present invention, therefore, contemplates a multi-access trunk circuit and toll ticketing circuitry associated therewith, each of which is equipped with a busy marking conductor which has a given potential condition placed thereon whenever the respective circuits with which it is incorporated are busy; and means interconnecting the busy marking conductors of the trunk circuit and the toll ticketing circuitry in such a manner that the given potential condition is placed on the busy marking conductor of the toll ticketing circuitry in response to the presence of the given potential condition on the busy marking conductor of the trunk circuit, but the given potential condition is not placed on the busy marking conductor of the trunk circuit in response to the presence of the given potential condition on the busy marking conductor of the toll ticketing circuitry.

Accordingly, it is one object of the present invention to provide an automatic toll ticketing system wherein the toll ticketing circuitry is marked busy in response to a busy condition existing in a multi-access trunk circuit with which it is associated, but which trunk circuit is prevented from being marked busy in response to a busy condition of the toll ticketing circuitry.

It is a further object to utilize a unidirectional conducting device to permit the toll ticketing circuitry to be marked busy in response to a busy condition existing in the multi-access trunk circuit and yet prevent the trunk circuit from being marked busy in response to a busy condition of the toll ticketing circuitry.

Figure 14:
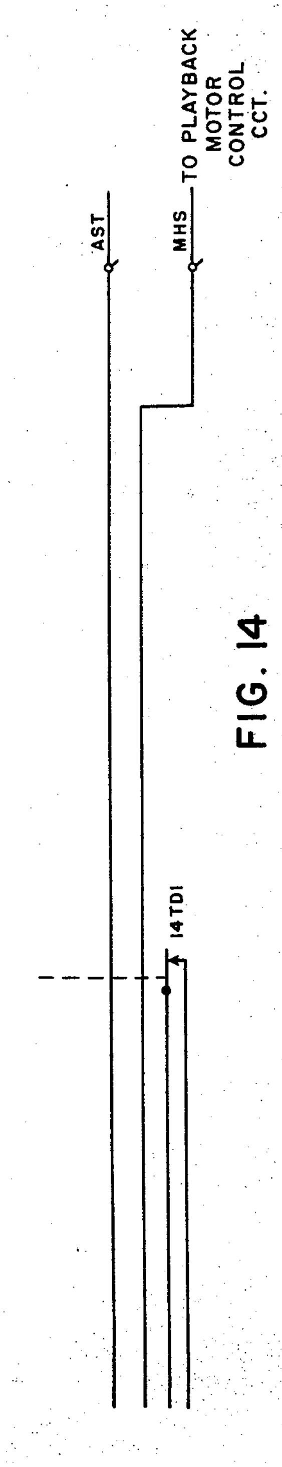
Figure 15:
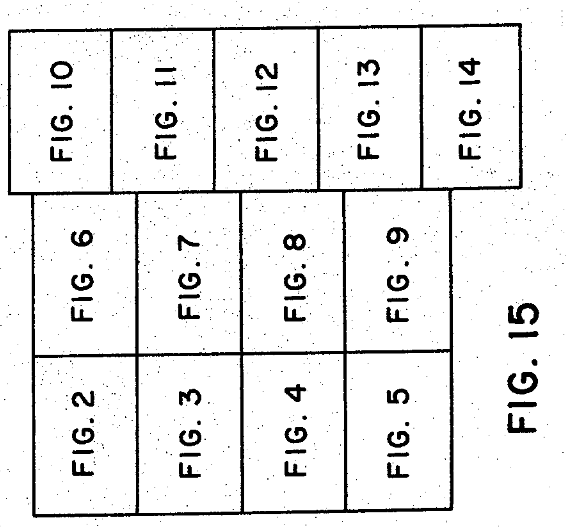

Other objects and advantages of the present invention will become apparent from the ensuing description of an illustrative embodiment thereof in the course of which reference is had to the accompanying drawings in which:

Fig. 1 is a block diagram illustrating a preferred embodiment of an automatic toll ticketing system incorporating a toll ticketing adapter in accordance with the principles of this invention;

Figs. 2–14, inclusive, form a schematic drawing illustrating the details of the toll ticketing adapter embodying the present invention; and Fig. 15 is a block diagram disclosing the manner in which Figs. 2–14, inclusive, are positioned adjacent each other to form a complete circuit diagram of the system embodying the present invention.

Referring now to Fig. 1, subscriber station A, designated by the reference numeral 110, is connected to a conventional line circuit 112 which is individual thereto. In a manner well known in the art, the initiation of a call by the subscriber at station A causes conductor S1 to be marked and a start signal to be applied to conventional line finder allotter 114; whereupon line finder allotter 114 causes a previously allotted line finder 116 to hunt for and find line circuit 112 with its marked conductor S1. After the finding of line circuit 112, the call is extended from station A through line circuit 112, conductors T1 and R1 and through line finder 116 to first selector 118 to effect the seizure thereof, and a holding ground is returned to line circuit 112 over conductor S1. Normally conductor HS1 is not connected to any point of potential. However, in certain cases, such as where subscriber station A is a pay station, for instance, it is desirable to prevent such a station from originating an automatic toll call. In these cases, the HS1 conductor is marked with ground potential.

Line finder allotter 114, after causing the operation of line finder 116, is effective in allotting another line finder for the next succeeding call. Conductors T1, R1, S1, and HS1, respectively, are also connected to the banks of a connector (not shown) for extending an incoming call to subscriber station A.

First selector 118, upon the seizure thereof, returns dial tone over the extended connection to subscriber station A. Should the subscriber station A wish to make an automatic toll call, he first dials a predetermined access digit, such as "2" in the illustrated embodiment shown in Fig. 1. This causes the conductor wipers T2, R2, S2 and HS2, respectively, of first selector 118 to contact the second level of the first selector switch, thereby further extending the connection through conductors T3, R3, S3, and HS3, respectively, to toll ticketing adapter 120 to effect the seizure thereof.

Toll ticketing adapter 120 incorporates circuit means therein responsive to seizure thereof for extending the connection both to a data storage means, such as recorder 122, associated therewith, which has an elongated record medium for recording billing information pertaining to a large number of calls, and through conductors T4, R4, S4, and HS4, respectively, to a second selector 124.

Should subscriber station A be one which is restricted from making automatic toll calls, ground will be extended from the HS1 conductor to the HS3 conductor. Toll ticketing adapter 120 includes means therein responsive to ground being present on the HS3 conductor for preventing the extension of the connection to either recorder 122 or second selector 124 and for returning busy tone over talking conductors T3 and R3.

However, assuming that the subscriber station A is not a restricted station, a subscriber at station A now dials a predetermined party digit, which is utilized in determining which particular subscriber on a party line is originating a toll call. This party digit is applied over the extended connection to recorder 122, and recorded thereby. However, toll ticketing adapter 120 includes means for preventing the application of the party digit to second selector 124 so that the party digit is ineffective in further extending the connection.

The subscriber at station A now successively dials the digits of the directory number of the called subscriber, which directory number is composed of a predetermined number of digits. Toll ticketing adapter 120 includes means for applying these dialed digits to both recorder 122 and to second selector 124.

Assuming that the first digit of the directory number of the called subscriber is "7," wiper conductors T5, R5, S5, and HS5, respectively, of second selector 124 are moved into contact with the seventh level of the second selector switch to thereby extend the connection to a multi-access trunk circuit, such as two-way trunk circuit 126, over conductors T6, R6, S6, and HS6, respectively. Two-way trunk circuit 126 is effective in extending the connection over trunk line I, designated by the reference numeral 128, to remote switching apparatus 130 located at a first distant office. The remaining dialed digits of the directory number are effective in operating remote switching apparatus 130 to complete the connection between calling subscriber station A and called subscriber station B, designated by the reference numeral 132, served by the first distant office. Conductors T8, R8, S8, and HS8, respectively, are utilized in connecting two-way trunk circuit 126 to the banks of an incoming selector (not shown), for incoming calls.

In a similar manner, if the first digit of the directory number of the called subscriber is "8," the second selector 124 is effective in extending the connection to a multi-access trunk circuit, such as two-way trunk circuit 134, rather than two-way trunk circuit 126. In this case, the dialing of the remaining digits of the directory number extend the connection through trunk line II, designated by the reference numeral 136, to operate remote switching apparatus 138 located at a second distant office to complete the connection between calling subscriber A and called subscriber C, designated by the reference numeral 140, served by the second distant office.

Although the embodiment illustrated in Fig. 1 provides access to a plurality of distant offices, sometimes access to only a single distant office is desired. In that case, second selector 124 may be omitted and toll ticketing adapter 120 may be connected directly to a trunk circuit.

Toll ticketing adapter 120 includes means therein for counting the number of dialed digits applied thereto after seizure thereof, and further includes means therein responsive to answer supervision signals applied thereto. Should an answer supervision signal be returned to toll ticketing adapter 120 before both the party digit and all the digits of the directory number of the called subscriber have been counted, means are provided in toll ticketing adapter 120 which break the extended connection to recorder 122 and second selector 124 and return busy tone to the calling subscriber at station A. However, in response to an answer supervision signal being returned to toll ticketing adapter 120 after both the party digit and all the digits of the directory number have been counted, means are provided in toll ticketing adapter 120 which call for the calling subscriber identification circuitry.

The calling subscriber identification circuitry is described in detail in the above-identified copending application of Clement and Harris. Briefly, however, an allotter start signal AST is applied from toll ticketing adapter 120 to identifier sender allotter 144. In response thereto, identifier sender allotter 144 causes one of a group of identifier senders 146 to become associated through cable 150 with the toll ticketing adapter 120; whereupon an identification start signal is applied from this identifier sender over cable 150 to toll ticketing adapter 120. In response to the identification start signal, a tone signal is applied to conductor HS3, and through the extended connection to conductor HS1, where it is then applied to identification matrix 142. Identification matrix 142 consists of a plurality of groups of resistance clusters. The HS1 conductor is connected to certain ones of these resistance clusters in accordance with the directory number of calling subscriber station A. Other subscriber stations, similar to subscriber station A, are connected to identification matrix 142 in accordance with their respective directory numbers.

Identifier circuit 148 is selectively operated in accordance with the particular energization of the resistance clusters of identification matrix 142 to thereby provide marking conditions extending to the identifier sender associated with toll ticketing adapter 120. This identifier sender then transmits a plurality of series of impulses manifesting the directory number of the calling station, such as station A, through toll ticketing adapter 120 to recorder 122.

In response to the identification of the calling subscriber being completed, toll ticketing adapter 120 drops the identification circuitry and calls in clock and calendar circuit 154 which is connected thereto through cable 152. Clock and calendar circuit 154, which is described in detail in the above-identified application of Clement and Harris, transmits a plurality of series of pulses manifesting the time and date of the call through toll ticketing adapter 120 to recorder 122.

Toll ticketing adapter 120 further includes means responsive to an answer supervision signal for timing the duration of the call. After the transmission of clock and calendar information is completed, toll ticketing adapter 120 is conditioned to periodically apply impulses manifesting the duration of the call to recorder 122.

Should the calling subscriber at station A hang up after a supervisory signal is returned, but prior to the transmission of identification information, toll ticketing adapter 120 is conditioned to hold the extended connection until the identification information is recorded by recorder 122, then "wink" off, releasing the preceding equipment, but maintaining toll ticketing adapter 120 busy until the clock and calendar information is recorded. Similarly, should calling subscriber at station A hang up after identification is complete, but prior to the recording of clock and calendar information, the preceding equipment will be released, but toll ticketing adapter 120 will remain busy until this clock and calendar information is recorded.

In a similar manner billing information pertaining to a plurality of other toll calls may be recorded on the elongated medium of recorder 122.

At periodic intervals, usually in the early morning when traffic is light, a signal is sent from clock and calendar circuit 154 over conductor 158 to initiate operation of playback circuit means 156. Although the playback circuit means described in detail in the above-identified copending application of Clement and Harris may be used, this invention contemplates the preferred use of the improved playback circuit means which forms the subject matter of the copending application of B. A. Harris, Serial No. 611,218, filed September 21, 1956, which application is assigned to the same assignee as the present application. This improved playback circuit means is featured by the fact that should the toll ticketing adapter 120 be busy with a call at the time playback circuit means 156 is associated therewith, playback circuit means 156 will wait for a predetermined period of time before it switches to a succeeding toll ticketing adapter. Should the busy condition of toll ticketing adapter 120 terminate before the end of this waiting period, all the billing information which has been recorded by recorder 122 will be played back. However, if it is desired that the billing information recorded by recorder 122 not be played back during a particular playback cycle, toll ticketing adapter 120 includes a key which may be operated, which when operated causes playback circuit means 156 to pass by toll ticketing adapter 120 without any waiting period.

Playback circuit means 156 is connected to toll ticketing adapter by a number of wires included in cable 160 which are common to a whole group of toll ticketing adapters. In addition, playback circuit means 156 is coupled to toll ticketing adapter 120 by conductor C and conductor CS which are individual to toll ticketing adapter 120. The significance of these conductors will become apparent from the detailed description of toll ticketing adapter 120 which follows. Playback circuit means 156 serves to apply the played-back signals from recorder 122 to the readout facilities 162, which utilizes the signals to produce printed toll tickets. Readout facilities 162, which form no part of the present invention, are described in detail in the above-identified copending application of Clement and Harris.

Figure 2:
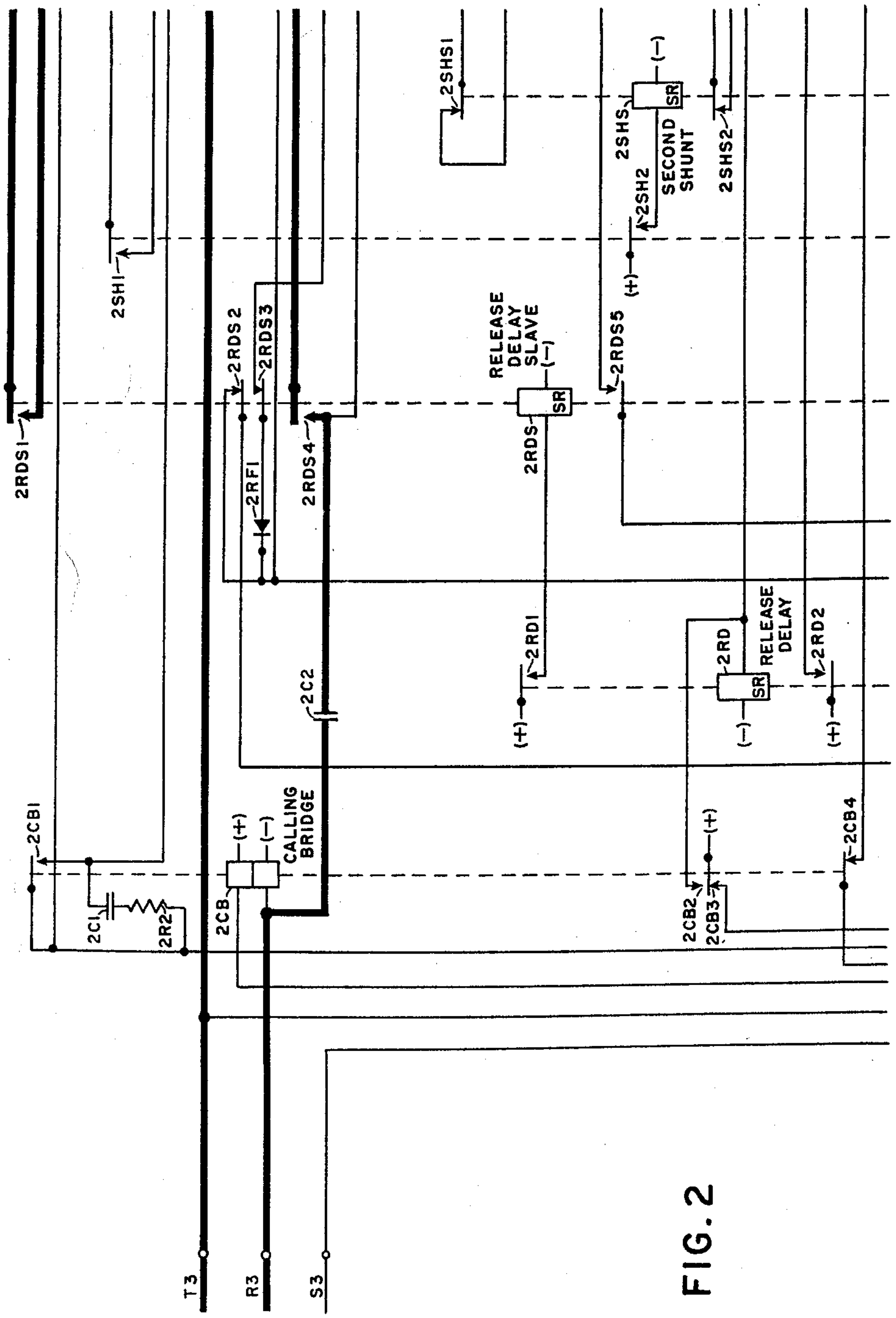
Figure 3:
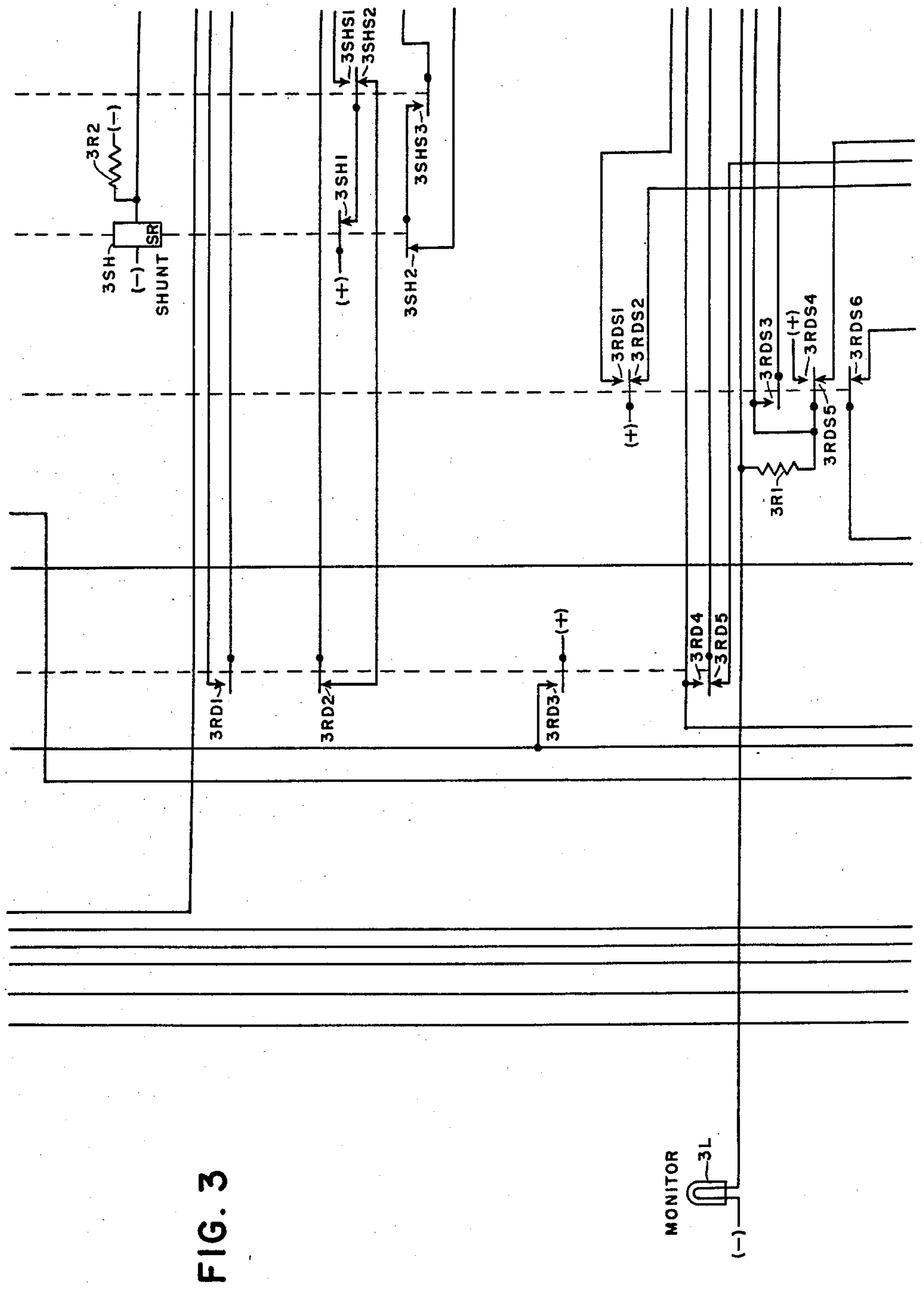

Referring now to Figs. 2–14, which show the detailed circuitry of toll ticketing adapter 120, the first numeral of the reference number identifying each respective element thereof locates the particular figure in which each respective element is located; i.e., all elements located in Fig. 2 are identified with reference numbers beginning with the numeral "2," all elements located in Fig. 3 are identified with reference numbers beginning with "3," etc.

Figure 10:
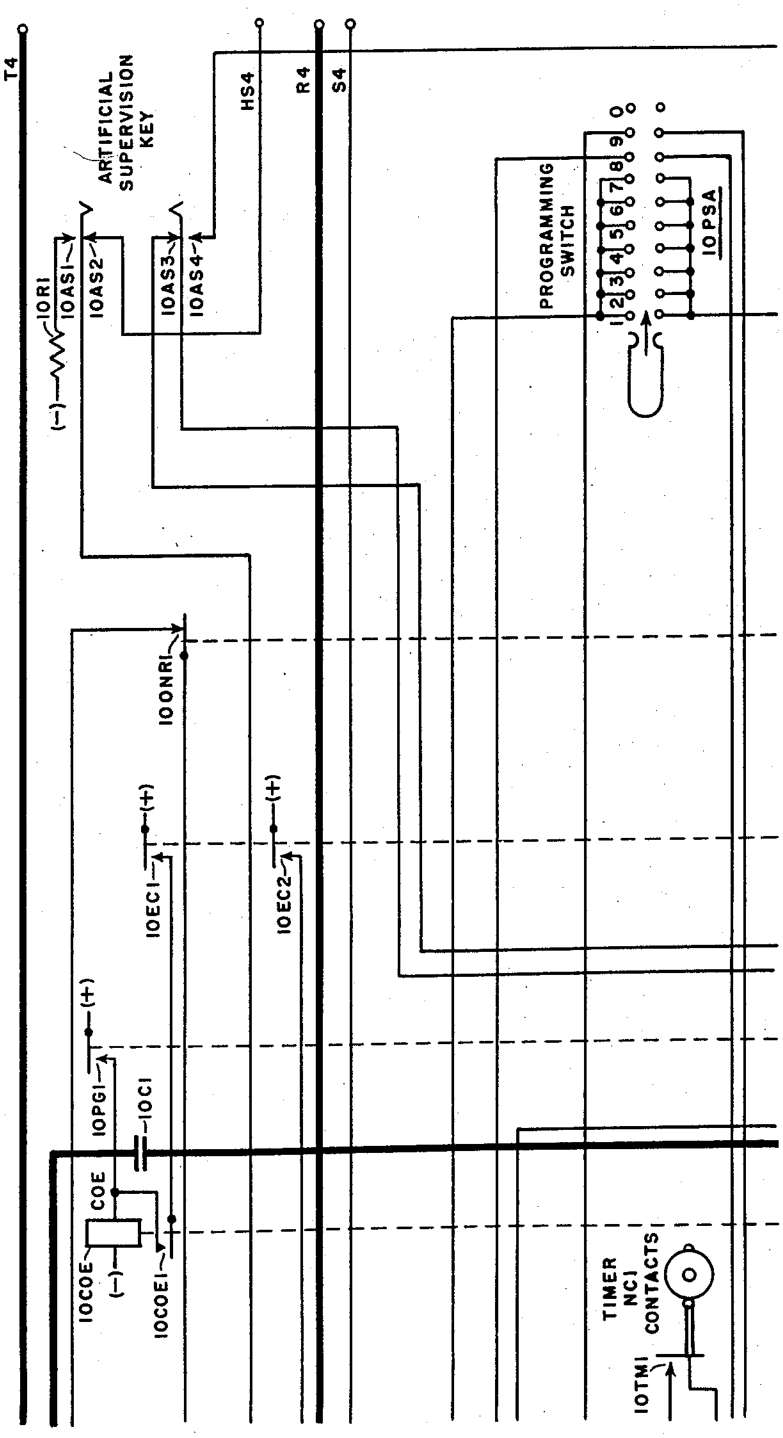
Figure 11:
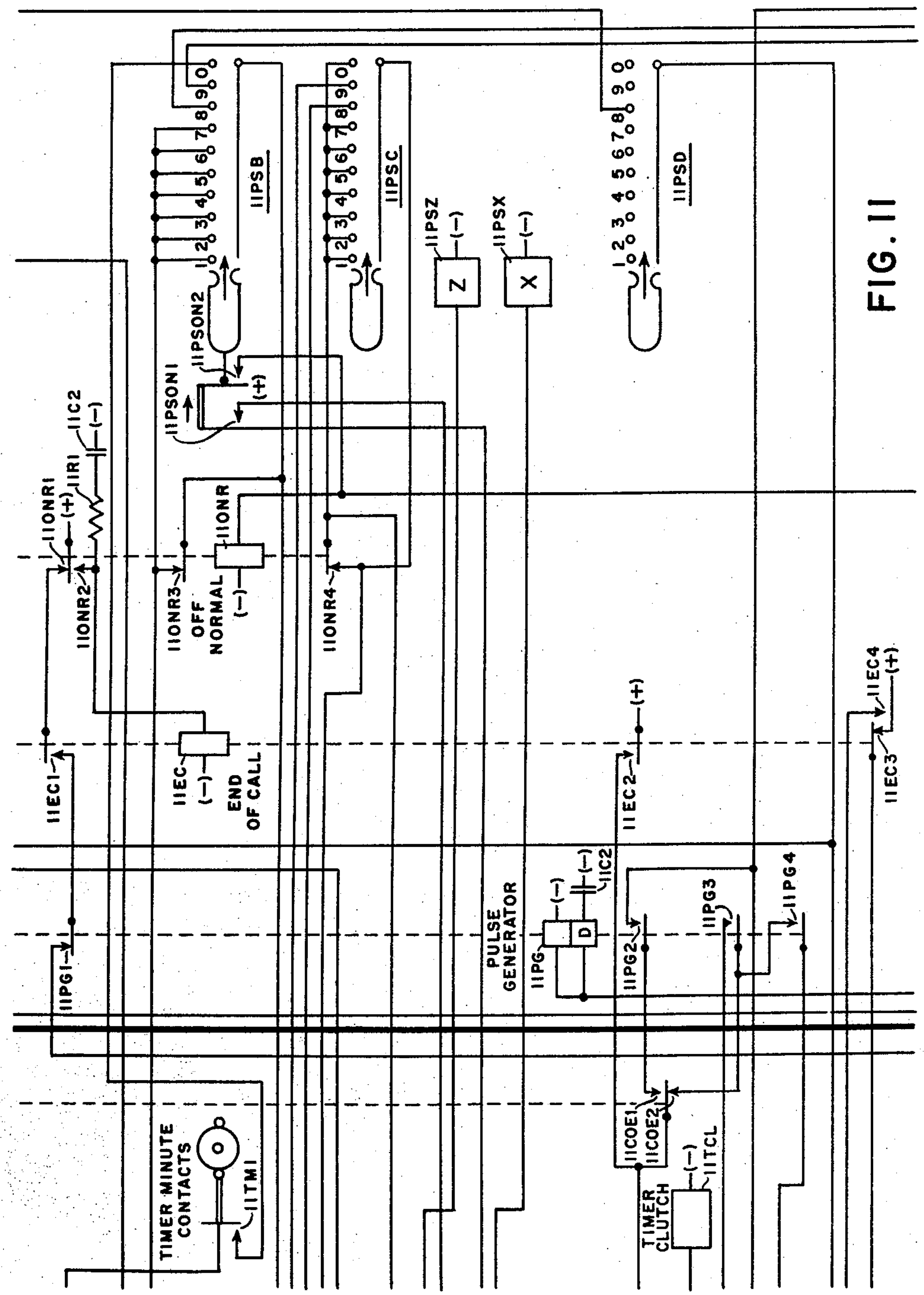
Figure 12:
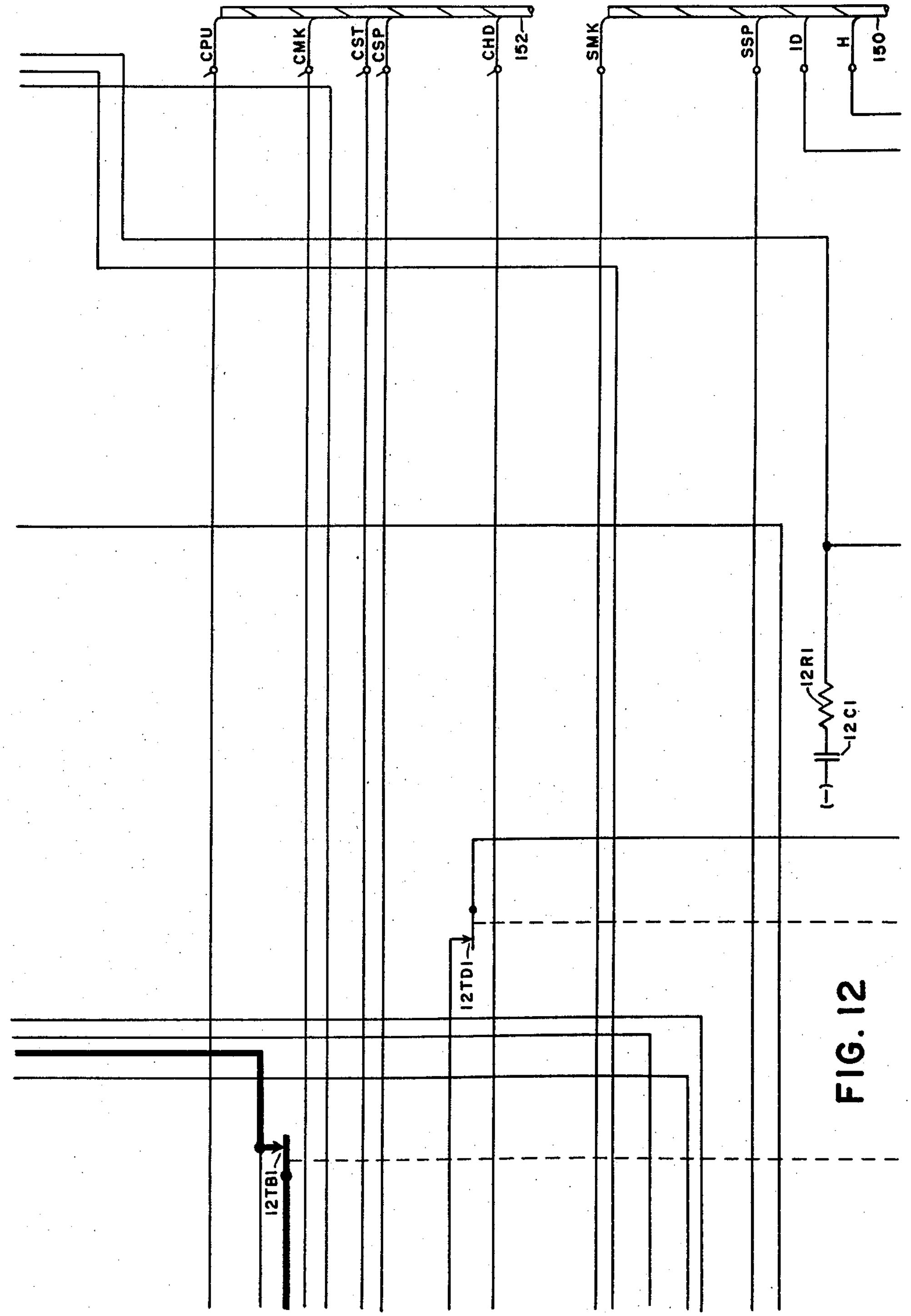
Figure 13:
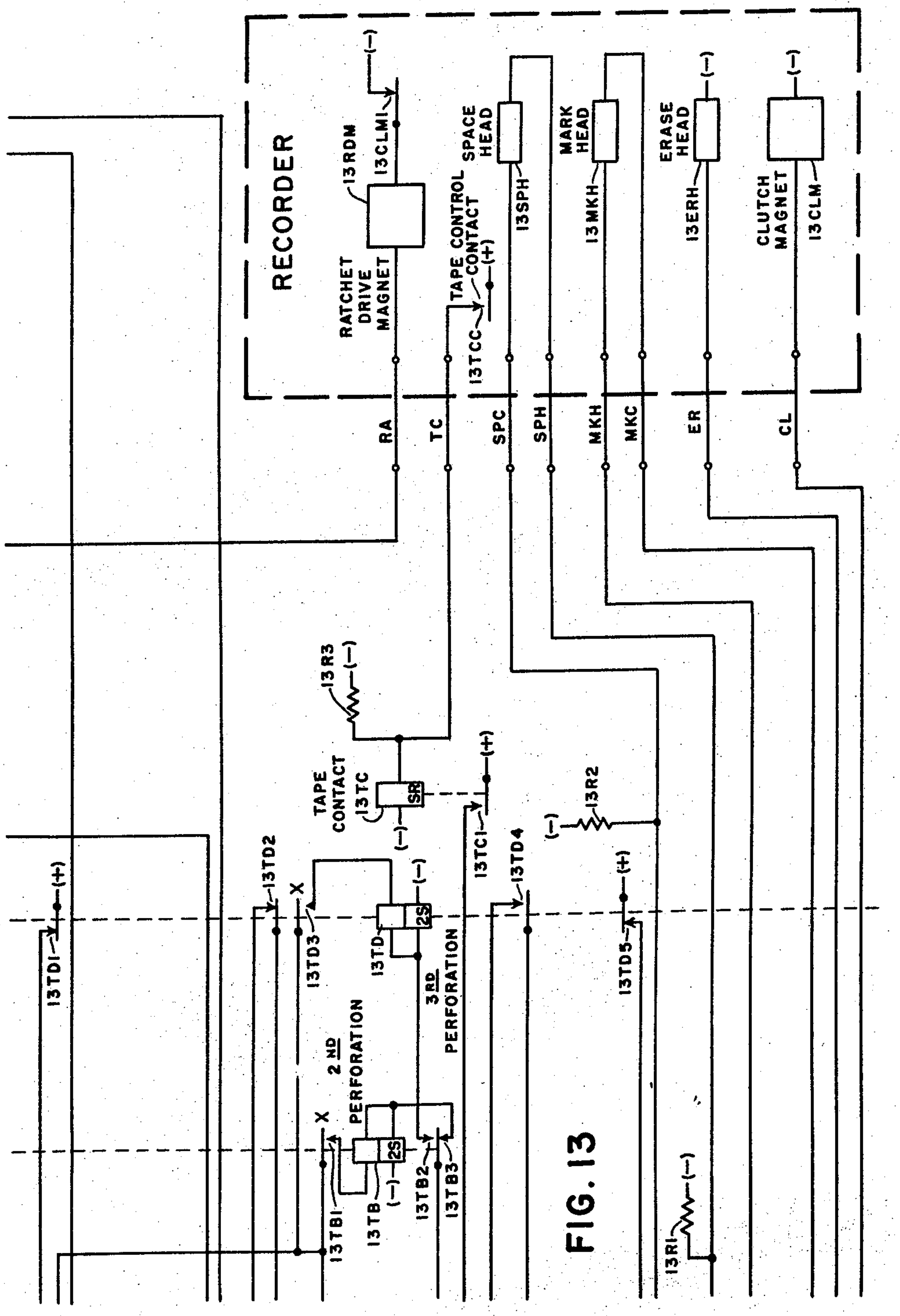

As heretofore discussed, the equipment directly succeeding toll ticketing adapter 120 may be second selector 124 or, if the automatic toll ticketing system is designed to serve only a single distant office, may be a two-way trunk circuit or other type multi-access trunk circuit. Should the equipment directly succeeding toll ticketing adapter 120 be a multi-access trunk circuit, busy marking conductor S4, extending therefrom, shown in Fig. 10, is connected through normally closed contacts 2RDS3, rectifier 2RF1, which is so connected as to be conductive in the direction shown, through normally closed contacts 2RDS2 and normally closed contacts 4PBY1 of the playback switch to busy marking conductor S3 of toll ticketing adapter 120, shown in Fig. 2. Whenever this trunk circuit is rendered busy over one of its other points of access, ground potential is applied to conductor S4 and returned over the above-described connection to conductor S3. The presence of ground on conductor S3 serves to mark toll ticketing adapter 120 as busy to the preceding equipment, and thereby prevents seizure thereof by a calling subscriber. Thus, if toll ticketing adapter 120 is followed directly by a multi-access trunk circuit, toll ticketing adapter 120 is placed in a busy condition in response to the succeeding trunk circuit being in a busy condition. However, in the case where second selector 124 is employed, the above-described connection between conductor S4 and conductor S3 may be omitted.

Assuming that toll ticketing adapter 120 is not in a busy condition, it may be seized by first selector 118, to thereby complete a loop between conductors T3 and R3, shown in Fig. 2. This causes the energization of calling bridge relay 2CB through a connection extending from ground, designated (+), through the upper winding of calling bridge relay 2CB, normally closed contacts 12TB1 to conductor T3, the completed loop between conductors T3 and R3, the conductor R3, and through the lower winding of calling bridge relay 2CB to grounded battery, designated (−).

Accordingly, calling bridge relay 2CB is operated to close normally open contacts 2CB1 and 2CB2, respectively, thereof, and to open normally closed contacts 2CB3 and 2CB4, respectively, thereof.

The closure of contacts 2CB2 completes an energizing path for release delay relay 2RD, extending from ground through operated contacts 2CB2 and the operating winding of release delay relay 2RD to grounded battery. Release delay relay 2RD therefore operates, closing normally open contacts 2RD1, 2RD2, 3RD1, 3RD3 and 3RD4, respectively, thereof, and opening normally closed contacts 3RD2 and 3RD5, respectively, thereof.

The closure of contacts 2RD1 completes an energization path for release delay slave relay 2RDS, extending from ground through operated contacts 2RD1 and the operating winding of release delay slave relay 2RDS to grounded battery. This causes release delay slave relay 2RDS to operate, closing normally open contacts 2RDS1, 2RDS4, 2RDS5, 3RDS1, 3RDS3 and 3RDS4, respectively, thereof, and opening normally closed contacts 2RDS2, 2RDS3, 3RDS2, 3RDS5 and 3RDS6, respectively, thereof.

The closure of contacts 3RDS3 and 3RDS4 results in monitor lamp being energized by a connection extending from ground through operated contacts 3RDS4 and 3RDS3, normally closed contacts 7SR2, and monitor lamp 3L to grounded battery. Therefore, monitor lamp 3L shines steadily bright, indicating that toll ticketing adapter 120 has been seized and a call is in the process of being extended.

The closure of contacts 3RD3 of release delay relay 2RD applies ground to conductor S3 through operated contacts 3RD3 and normally closed contacts 4PBY1 of the playback release switch. The presence of ground on conductor S3 serves to mark toll ticketing adapter 120 as busy to the preceding equipment, and thereby prevents seizure thereof by another calling subscriber.

Assuming that the call is originating from a non-restricted calling subscriber line, which is free to utilize the automatic toll ticketing facilities, the closure of contacts 2RDS1 and 2RDS4, respectively, of release delay slave relay 2RDS completes a loop between conductors T4 and R4, shown in Fig. 10, extending from conductor T4 through operated contacts 2RDS1, retard coil 6RE, operated contacts 2CB1 shunted by normally closed contacts 10ONR1, and through normally closed contacts 8RS3 and operated contacts 2RDS4 to conductor R4. The completion of a loop between conductors T4 and R4 results in the seizure of the succeeding equipment, which may be second selector 124 or a two-way trunk circuit, if the toll ticketing circuitry serves only a single distant office.

Figure 4:
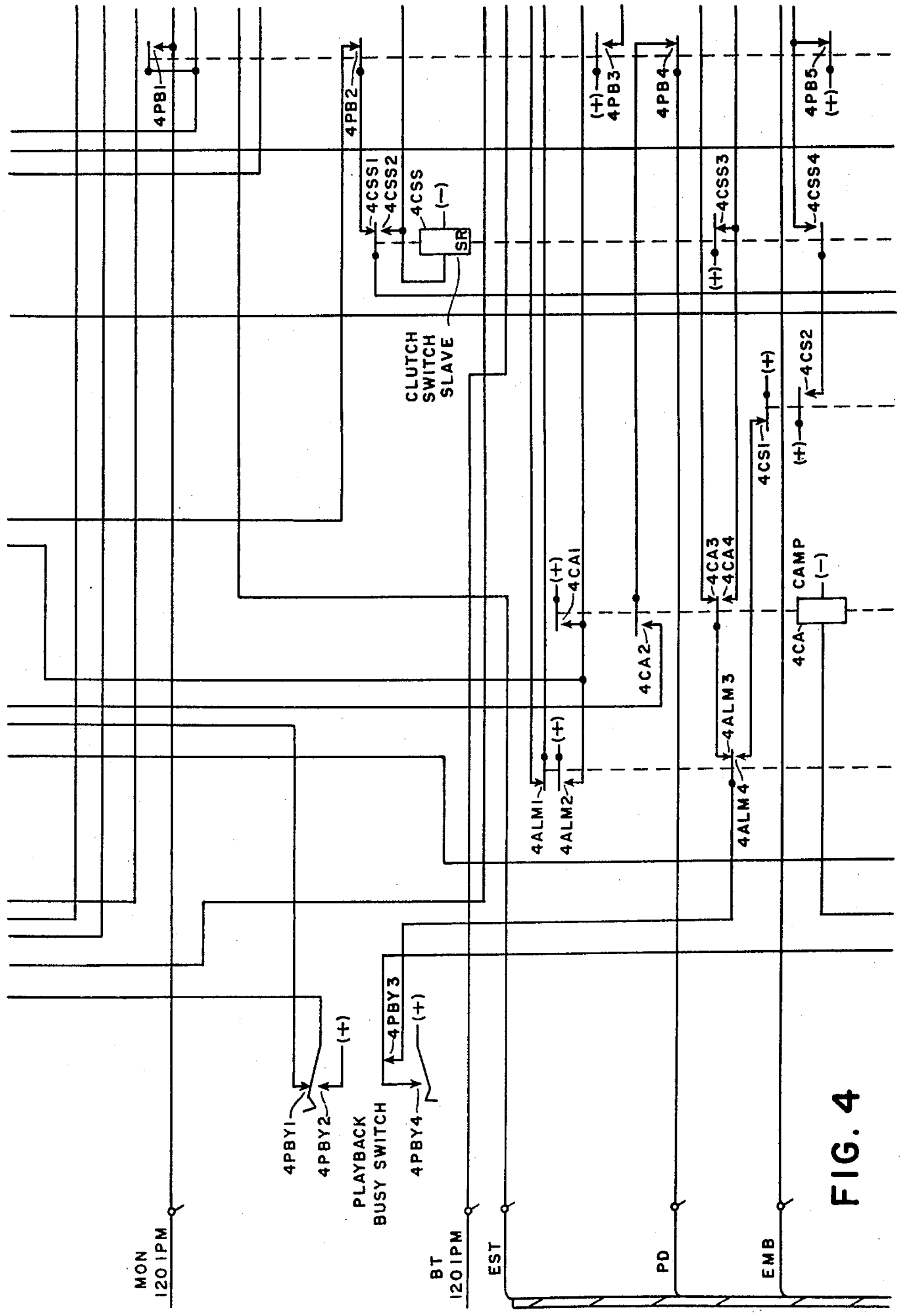

Should the call originate from a station which is restricted from making use of the automatic toll ticketing circuitry, as heretofore described, ground will be present on conductors HS3, shown in Fig. 4. The presence of ground on conductor HS3 causes the energization of the lower winding of restricted service relay 8RS, through a circuit extending from conductor HS3, normally closed contacts 9ID3 and the lower winding of restricted service relay 8RS to grounded battery. The resulting operation of restricted service relay 8RS is effective in opening normally closed contacts 8RS1, 8RS2 and 8RS3, respectively, therof and closing normally open contacts 8RS4 and 8RS5, respectively, thereof. The closure of 8RS5 causes busy tone to be applied to the T3 conductor from the conductor "BT–120IPM" conductor, shown in Fig. 4, through capacitor 8C1 and operated contacts 8RS5 to the T3 conductor. The opening of contacts 8RS3, in response to the operation of restricted service relay 8RS, prevents the completion of the loop between conductors T4 and R4, thereby preventing the further extension of a connection through the succeeding equipment. The significance of the other contacts controlled by restricted service relay 8RS will be discussed in detail below.

After the seizure of toll ticketing adapter 120 is completed, and the calling bridge relay 2CB, the release delay relay 2RD and the release delay slave relay 2RDS have been operated, the calling subscriber proceeds to sequentially dial a predetermined number of directive signals, the first of which is a party digit designating the party position of the calling subscriber on a party line and the remainder of which are the directory number of the called subscriber. In the preferred embodiment described herein this predetermined number of directive signals is eight.

In response to the first pulse of the first directive signal the loop between conductors T3 and R3 is broken, causing relay 2CB to restore. The restoration of calling bridge relay 2CB causes contacts 2CB1 thereof, which form part of the loop between conductors T4 and R4, to open. However, the opening of contacts 2CB1 has no effect at this time, since these contacts are shunted by normally closed contacts 10ONR1.

The restoration of calling bridge relay 2CB further causes contacts 2CB2 thereof to be reopened, and contacts 2CB3 and contacts 2CB4 thereof to be reclosed. The reopening of contacts 2CB2 results in release delay relay 2RD being deenergized, but since this relay is slow to release, it does not restore at this time.

If a call originates from a non-restricted station, the reclosing of contacts 2CB3 serves to complete a connection for operating shunt relay 3SH, which connection extends from ground through reclosed contacts 3CB3, normally closed contacts 11ONR4, operated contacts 3RD1, normally closed contacts 8RS1, the operating winding of shunt relay 3SH in parallel with resistor 3R2 to grounded battery. Should the call originate from a restricted station, restricted service relay 8RS is operated, in the manner described above, thereby opening normally closed contacts 8RS1, so that no operating connection is extended to shunt relay 3SH.

Assuming, however, that the call originates from a non-restricted station, shunt relay 3SH is operated to close normally open contacts 2SH1 and 2SH2, respectively, thereof, and to open normally closed contacts 3SH1 and 3SH2, respectively, thereof. The closing of contacts 2SH1 serves to short circuit retard coil 6RE through a circuit extending from one side of retard coil 6RE through operated contacts 2SH1 and normally closed contacts 6SRS1 to the other side of retard coil 6RE. The closure of contacts 2SH2 causes the energization of second shunt relay 2SHS through a connection extending from ground through operated contacts 2SH2 and the operating winding of second shunt relay 2SHS to grounded battery.

In response to the energization thereof, second shunt relay 2SHS operates to open normally closed contacts 2SHS1, 2SHS2 and 3SHS2, respectively, thereof, and to close normally open contacts 3SHS1 and 3SHS3, respectively, thereof.

The reclosing of contacts 2CB4, in response to the restoration of calling bridge relay 2CB, completes a path for operating mark relay 7MK, which path extends from grounded battery through the operating winding of mark relay 7MK in parallel with resistor 7R1, through normally closed contacts 11ONR3, reclosed contacts 2CB4, normally closed contacts 8RS2 and operated contacts 2RD2 to ground. Again, if the call originates from a restricted station, this connection is not completed, since restricted service relay 8RS is then operated and normally closed contacts 8RS2 are open.

Assuming, however, that the call originates from a non-restricted station, mark relay 7MK is operated, closing normally open contacts 7MK1 and 7MK2, respectively, thereof. The closure of contacts 7MK2 causes the energization of mark head 13MKH, located in recorder 122 associated with toll ticketing adapter 120, through a connection extending from ground through normally closed contacts 7MKS2, operated contacts 7MK2, normally closed contacts 5CS10, conductor MKH, mark head 13MKH, conductor MKC, normally closed contacts 5CS13, and resistor 5R4 to grounded battery. In addition, conductor MKH is connected to grounded battery through resistor 9R2 and conductor MKC is connected to grounded battery through resistor 9R1.

Although the recorder is described in detail in the above-identified copending application of Clement and Harris, it might be well at this time to point out that the recorder contemplated by this invention utilizes a continuous magnetic tape as a record medium. The tape is provided with either three closely spaced perforations or foil contacts, which locate an initial starting position on the tape. The tape may be alternately driven intermittently by means of a ratchet drive magnet or continuously by means of a clutch magnet which couples the tape to a rotating shaft. Mark pulses, recorded on a first channel of the tape, manifest each item of billing information. Space pulses, recorded on a second channel of the tape, separate successive items of billing information. Coe signals, consisting of coincident mark and space pulses, are recorded at the termination of each call in order to separate one call from another. In addition, a preliminary Coe signal is recorded immediately beyond the last of the perforations at the initial starting point of the tape. An erase head is also provided for removing previously recorded mark and space pulses. The operation of the recorder will become clearer as the description proceeds.

Returning now to the description of Figs. 2–14, the closure of contacts 7MK1 energizes second mark relay 7MKS through a connection extending from ground, through operated contacts 7MK1 and the operating winding of second mark relay 7MKS in parallel with resistor 7R2 to grounded battery. This causes second mark relay 7MKS to operate, closing normally open contacts 7MKS1 thereof and opening normally closed contacts 7MKS2 thereof. The opening of contacts 7MKS2 breaks the previously described connection through operated contacts 7MK2 for energizing mark head 13MKH, thereby ending the recording of the first mark pulse. The closure of contacts 7MKS1 extends a connection from ground, through conductor RA, and ratchet drive magnet 13RDM and normally closed clutch magnet interrupter contacts 13CLM1 in the recorder, to grounded battery, thereby energizing ratchet drive magnet 13RDM. Conductor RA is also connected to grounded battery through serially connected resistor 12R1 and capacitor 12C1. This results in ratchet drive magnet 13RDM operating to move the magnetic tape one step forward.

At the end of the first pulse of the first dialed directive signal, calling bridge relay 2CB is reoperated, causing normally closed contacts 2CB4 to be opened. The opening of contacts 2CB4 breaks the above-described energizing path for mark relay 7MK. Therefore, mark relay 7MK restores, opening normally open contacts 7MK1. The opening of contacts 7MK1 breaks the previously described connection for energizing second mark relay 7MKS. Therefore, second mark relay 7MKS restores, opening normally open contacts 7MKS1, thereby breaking the previously described connection for energizing ratchet drive magnet 13RDM.

In reoperating, calling bridge relay 2CB also recloses normally open contacts 2CB2, thereby reenergizing release delay relay RD, which has not restored due to its slow release characteristics, and opens normally closed contacts 2CB3. The opening of contacts 2CB3 breaks the previously described connection for energizing the shunt relay 3SH. However, since shunt relay 3SH is also slow to release, neither it nor second shunt relay 2SHS, controlled thereby, releases at this time.

Each of the remaining pulses of the first dialed directive signal causes calling bridge relay 2CB to be sequentially restored and then reoperated. In response thereto, mark relay 7MK, second mark relay 7MKS, mark head 13MKH, and ratchet drive magnet 13RDM operate in the manner described above to record a number of additional spaced marked pulses on the magnetic tape equal in number to the remaining pulses of the first dialed directive signal.

At the finish of the last pulse of the first dialed directive signal, calling bridge relay 2CB remains operated, thereby maintaining normally closed contacts 2CB3 thereof open, so that the operating path for shunt relay 3SH is broken. After a time determined by its slow release characteristics, shunt relay 3SH restores, thereby opening normally open contacts 2SH2 thereof, which breaks the energizing path for second shunt relay 2SHS. Since second shunt relay 2SHS is also a slow to release relay, it does not restore for a certain period of time. During this period of time, between the restoration of shunt relay 3SH and the restoration of second shunt relay 2SHS, respective operating paths are established for the X drive magnet 11PSX of the programming switch and for space relay 7SP.

The operating path for space relay 7SP extends from ground through normally closed contacts 7SRS4, operated contacts 3SHS3, normally closed contacts 3SH2 and the operating winding of space relay 7SP in parallel with resistor 7R3 to grounded battery. Space relay 7SP therefore operates, closing normally open contacts 7SP2 thereof, which extends an energizing path to space head 13SPH in the recorder from ground through normally closed contacts 7SPS2, operated contacts 7SP2, normally closed contacts 5CS8, conductor SPH, space head 13SPH, conductor SPC, normally closed contacts 5CS7, and resistor 5R3 to grounded battery. In addition, conductor SPH is connected to grounded battery through resistor 13R1 and conductor SPC is connected to grounded battery through resistor 13R2.

The operation of space relay 7SP further closes normally open contacts 7SP1 to provide an operating path for second space relay 7SPS extending from ground through operated contacts 7SP1 and the winding of second space relay 7SPS in parallel with resistor 7R4 to grounded battery. Second space relay 7SPS therefore operates, opening normally closed contacts 7SPS2 thereof, and closing normally open contacts 7SP1 thereof. The opening of contacts 7SPS2 breaks the previously described connection for energizing space head 13SPH, ending the recording of the first space pulse, and the closure of contacts 7SPS1 applies operating ground through the previously described circuit for energizing ratchet drive magnet 13RDM.

The operating path, mentioned above, for X drive magnet 11PSX of the programming switch extends from ground, through normally closed contacts 3SH1, operated contacts 3SHS1 and the operating winding of the X drive magnet 11PSX2 to grounded battery. In response to the energization thereof, X drive magnet 11PSX causes the respective wipers of banks 10PSA, 11PSB, 11PSC and 11PSD to move off normal to contact the number "1" step position of the programming switch. In moving off normal, the normally open off normal contacts 11PSON1 and 11PSON2, respectively, of the programming switch are closed. The closure of off normal contacts 11PSON2 provides an operating path for off normal relay 11ONR extending from ground through operated contacts 11PSON2 and the operating winding of off normal relay 11ONR to grounded battery. Off normal relay 11ONR therefore operates to open normally closed contacts 10ONR1, 7ONR1 11ONR3, and 11ONR4, respectively, thereof, and to close normally open contacts 11ONR2 thereof.

In response to the closure of contacts 11ONR2, end of call relay 11EC is energized by a circuit extending from ground through operated contacts 11ONR2 and the operating winding of end of call relay 11EC to grounded battery. Therefore, end of call relay 11EC operates to close contacts 10EC1, 10EC2, 11EC1, 11EC2 and 11EC4, respectively, thereof, and open contacts 11EC3, thereof. End of call relay 11EC is shunted by serially connected resistor 11R1 and capacitor 11C2.

After this, second shunt relay 2SHS restores.

The calling subscriber now dials the second directive signal. In response to each pulse of the second directive signal, calling bridge relay 2CB sequentially restores and reoperates, causing contacts 2CB1 thereof to reopen and reclose in synchronism therewith. Since off normal relay 11ONR has previously been operated, contacts 2CB1 are no longer shunted by normally closed contacts 10ONR1, as they were during the dialing of the first directive signal manifesting the party digit of the calling subscriber. The pulsing of contacts 2CB1, therefore, serves to successively interrupt the loop between conductors T4 and R4, thereby repeating the second dialed directive signal to the succeeding equipment. Contacts 2CB1 are shunted by serially connected resistor 2R2 and capacitor 2C1, which prevent sparking across these contacts.

In response to the restoration of calling bridge relay 2CB by the first pulse of the second directive signal, an operating path for shunt relay 3SH is established, which path extends from ground, through reclosed contacts 2CB3, the common conductor and wiper of bank 11PSC of the programming switch to step position "1" thereof, and then through operated contacts 3RD1, normal contacts 8RS1 and the operating winding of shunt relay 3SH in parallel with resistor 3R2 to grounded battery. Shunt relay 3SH and second shunt relay 2SHS, controlled thereby, reoperate in the same manner and with the same effect as previously described in connection with the dialing of the first directive signal. Since both shunt relay 3SH and second shunt relay 2SHS are slow to release, they remain operated until the interdigit time following the dialing of the second directive signal.

The reclosing of contacts 2CB4, of calling bridge relay 2CB, in response to each pulse of the second dialed directive signal, establishes an operating path for mark relay 7MK, which path extends from grounded battery, through the operating winding of mark relay 7MK in parallel with resistor 7R1, the common conductor and wiper of bank 11PSB of the programming switch to step position "1" thereof, and then through reclosed contacts 2CB4, normally closed contacts 8RS2, and operated contacts 2RD2 to ground. Therefore, mark relay 7MK, and second mark relay 7MKS controlled thereby, operate in the manner previously described in connection with the first dialed directive signal to sequentially operate mark head 13MKH and ratchet drive magnet 13RDM in the recorder to record on the magnetic tape a series of spaced marked pulses equal in number to the number of pulses in the second directive signal.

Upon the completion of the dialing of the second directive signal, slow to release shunt relay 3SH restores, and during the period prior to the restoration of slow to release second shunt relay 2SHS, is effective, in the manner previously described in connection with the first dialed directive signal, in establishing operating paths for programming switch X drive magnet 11PSX and space relay 7SP. In response thereto, the wipers of the programming switch are stepped to the number "2" position, and space relay 7SP, and second space relay 7SPS, controlled thereby, operate space head 13SPH and ratchet drive magnet 13RDM, in the manner previously described, to record a second space pulse on the magnetic tape.

Since step positions "2" to "7," inclusive, of bank 11PSB and 11PSC, respectively, of the programming switch are connected in parallel with step positions "1" thereof, the sequential dialing of each of the remaining six directive signals is effective in operating toll ticketing adapter 120 in a manner identical to that just described in connection with the second dialed directive signal. Thus, upon the completion of the dialing of the eighth directive signal, which is the last digit of the directory number of the called subscriber, the wipers of the programming switch are stepped to the number "8" position thereof.

The foregoing description assumes that the calling subscriber has dialed correctly. Should the calling subscriber have dialed the wrong number, it may, depending upon the details of the succeeding switching circuitry, be possible that a connection is extended to some other subscriber or to an operator's position, although the calling subscriber has dialed fewer than the full compliment of directive signals. In that case, if the wrong number answers, an answer supervision signal, consisting of resistance battery, will be returned over the HS4 conductor, shown in Fig. 10. The presence of an answer supervision signal on conductor HS4 is effective in operating supervisory relay 6SR through a connection extending from conductor HS4 through normally closed contacts 10AS2 of the artificial supervision key, the operating winding of supervisory relay 6SR, normally closed contacts 7SRS2, normally closed contacts 10AS3 of the artificial supervision key, and operated contacts 3RDS1 to ground.

Supervisory relay 6RS in operating, closes normally open contacts 6SR1 and 7SR1, respectively, thereof, and opens normally closed contacts 7SR2 thereof. The closure of contacts 6SR1 provides an energizing path for timer motor 6TM extending from grounded battery through operated contacts 6SR1 and timer motor 6TM in parallel with serially connected resistor 6R1 and capacitor 6C1 to ground. This initiates the rotation of a drive shaft coupled to timer motor 6TM.

The closure of contacts 7SR1 provides an energizing path for timer clutch 11TCL, which path extends from ground through operated contacts 11EC2 and 7SR1, and the operating winding of timer clutch 11TCL to grounded battery. The operation of timer clutch 11TCL couples the rotating shaft of timer motor 6TM to timer NCI contacts 10TM1 and timer minute contacts 11TM1, respectively.

The opening of contacts 7SR2, which are in the previously described operating path for monitor lamp 3L, breaks a connection through operated contacts 3RDS3 which shunts resistor 3R1, so that now resistor 3R1 is inserted in series with monitor lamp 3L, and monitor lamp 3L shines steadily dim, indicating that the call has been extended to an answering station.

A short predetermined time interval following energization of timer motor 6TM and timer clutch 11TCL, timer NCI contacts 10TM1 are closed, providing an operating path for second supervisory relay 6SRS extending from grounded battery through the operating winding of second supervisory relay 6RS, now closed contacts 10TM1, operated contacts 2RDS5, and normally closed contacts 5ALM2 to ground.

In response to the operation thereof, supervisory relay 6SRS6 opens normally closed contacts 6SRS1, 7SRS2, 7SRS4, and 7SRS5, respectively, thereof, and closes normally open contacts 6SRS2, 6SRS3, 6SRS4, 6SRS5, 6SRS6, 6SRS7, 6SRS8, 7SRS1, 7SRS3, and 7SRS6, respectively, thereof. The closure of contacts 6SRS7, which shunt timer NCI contacts 10TM1, provides a holding ground for second supervisory relay 6SRS.

Since an answer supervision signal was returned prior to the dialing of the full complement of directive signals, the closure of contacts 6SRS4 is effective in providing an operating path for restricted service relay 8RS through a connection extending from ground through operated contacts 2RD2 and 6SRS4, any one of step positions "1" to "7," inclusive, of bank PSA of the programming switch, and upper operating winding of the restricted service relay 8RS to grounded battery. Therefore, restricted service relay 8RS operates to open normally closed contacts 8RS1, 8RS2, and 8RS3, respectively, thereof, and close normally open contacts 8RS4 and 8RS5, respectively, thereof.

The closure of contacts 8RS4 provides a holding ground for restricted service relay 8RS through a connection extending from ground through operated contacts 2RD2 and 8RS4 to the upper operating winding of the restricted service relay 8RS.

As discussed above in connection with a call originating from a restricted station, the opening of contacts 8RS1 breaks the operating path for shunt relay 3SH, the opening of contacts 8RS3 breaks the operating path for mark relay 7MK, the opening of contacts 8RS3 breaks the loop between conductors T4 and R4, thereby releasing the succeeding equipment, and the closure of contacts 8RS5 is effective in returning busy tone to the calling subscriber over conductor T3. Thus, in response to an answer supervision signal being returned prior to the dialing of the full complement of directive signals, toll ticketing adapter is prevented from maintaining an extended connection and from recording any further billing information.

Assuming now, however, that the full complement of directive signals have been dialed correctly, a talking connection is extended to the dialed subscriber over conductor T3, normally closed contacts 12TB1, capacitor 10C1, operated contacts 2RDS1, and conductor T4; and over conductor R3, capacitor 2C2, operated contacts 2RDS4, and conductor R4. Furthermore, the wipers of the programming switch have been advanced, in the manner previously described, to the number "8" step position of banks 10PSA, 11PSB, 11PSC, and 11PSD thereof.

If the called subscriber should now be busy, a flashing resistance battery signal is returned over conductor HS4, and is applied to supervisory relay 6SR over the path previously described in connection with the return of an answer supervision signal prior to the dialing of the full complement of directive signals. This causes supervisory relay 6SR to operate and restore in synchronism with the flashing resistance battery signal applied thereto. As described above, the operation of supervisory relay 6SR results in the energization of timer motor 6TM and timer clutch 11TCL, which initiate a timing cycle of timer NCI contacts 10TM1 and timer minute contacts 11TM1. However, in this case, supervisory relay 6SR restores long before the completion of the timing cycle of timer NCI contacts 10TM1, and in response thereto, timer NCI contacts 10TM1 return to their initial starting position. This happens on each reoperation and restoration of supervisory relay 6SR. Therefore, when the called subscriber station is busy, the timing mechanism is ineffective in closing timer NCI contacts 10TM1. Hence, second supervisory relay 6SRS remains unoperated.

Assuming, however, that the called subscriber is not busy, but answers his phone, an answer supervision signal, consisting of resistance battery, is returned over the HS4 conductor. Therefore, supervisory relay 6SR and second supervisory relay 6SRS are operated, in the manner previously described in connection with the return of an answer supervision signal prior to the dialing of the full complement of directive signals.

The opening of contacts 6SRS1, in response to the operation of second supervisory relay 6SRS, further breaks the circuit through normally open contacts 2SH1 shunting retard coil 6RE. Therefore, subsequent operation of shunt relay 3SH will be ineffective in shunting retard coil 6RE. The closure of contacts 6SRS2 provides a shunt across contacts 2CB1, so that any additional directive signals, which the calling subscriber may attempt to dial, will not be repeated to the succeeding equipment. The opening of contacts 7SRS5 removes the operating ground for space relay 7SP, so that space relay 7SP will now not be energized in the interim between the restoration of shunt relay 3SH and the restoration of second shunt relay 2SHS in the manner previously described.

Since the wipers of the programming switch are now in contact with the number "8" step position of bank 10PSA, no connection is extended to operate restricted service relay 8RS, but, instead, an operating path is provided for line identification relay 8LID. This operating path extends from ground through operated contacts 2RD2, the number "8" step position of bank 10PSA of the programming switch, normally closed contacts 2SHS1, operated contacts 6SRS5, and the operating winding of line identification relay 8LID to grounded battery. This causes line identification relay 8LID to operate, closing normally open contacts 9LID1 and 9LID2, respectively, thereof.

The closure of contacts 9LID2 is effective in applying ground over allotter start conductor AST to identifier sender allotter 144, shown in Fig. 1. As previously described in connection with Fig. 1, identifier sender allotter 144, in response to a start signal applied thereto, causes one of identifier senders 146 to be associated with toll ticketing adapter 120 over cable 150. In response to an identifier sender being associated with toll ticketing adapter 120, ground is returned over conductor ID of cable 150. This ground provides an energizing path for start identification relay 8SD, extending from conductor ID, normally closed contacts 8SD4, and the operating winding of start identification relay 8SD to grounded battery. Therefore, start identification relay 8SD operates, thereby closing normally open contacts 8SDI, 8SD2, 8SD3, 8SD5, and 8SD6, respectively, therefore, and opening normally closed contacts 8SD4, thereof.

The opening of contacts 8SD4 breaks the operating path for start identification relay 8SD, but the concurrent closure of contacts 8SD5 applies a holding ground thereto through operated contacts 9LID1. In addition, the association of an identifier sender with toll ticketing adapter 120 applies an alternate holding ground for start identification relay 8SD over conductor H of cable 150.

The closure of contacts 8SDI provides an energizing path for shunt relay 3SH extending from ground through operated contacts 8SD1, resistor 8R1, and the operating winding of shunt relay 3SH in parallel with resistor 3R2 to grounded battery. Therefore, shunt relay 3SH, and second shunt relay 2SHS controlled thereby, operate in the manner previously described. In operating, second shunt relay 2SHS opens normally closed contacts 2SHS1, thereby breaking the energizing path for line identification relay 8LID. Therefore, line identification relay 8LID restores, breaking the holding ground connection for start identification relay 8SD by opening contacts 9LID1 thereof. However, start identification relay 8SD is maintained operated by the alternate holding ground applied over conductor H of cable 150.

The closure of contacts 8SD6 provides an operating path for identification relay 8ID extending from the ground on conductor ID of cable 150 through operated contacts 8SD6 and the operating winding of identification relay 8ID to grounded battery. This causes identification relay 8ID to operate, closing contacts 9ID1 and 9ID2, respectively, thereof and opening contacts 9ID3 thereof.

The closure of contacts 9ID1 provides a further holding ground for start identification relay 8SD. The closure of contacts 9ID2 results in a tone signal generated in a tone power circuit (not shown), which circuit is fully described in the above-identified application of Clement and Harris, to be applied over conductor IDS through operated contacts 9ID2 to conductor HS3. As previously described in connection with Fig. 1, this tone signal is returned over the preceding switch train to the HS1 conductor individual to the line circuit of the calling subscriber, and is then applied to particular resistance clusters in identification matrix 142 in accordance with the directory number of the calling subscriber. This causes identifier circuit 148 to mark the identifier sender associated with toll ticketing adapter 120 in accordance with the selective energization of identification matrix 142. In response to this identifier sender being so marked, ground is removed from conductor ID of cable 150. This results in the deenergization of identification relay 8ID, which then restores.

Immediately thereafter, a first series of ground pulses, generated by the identifier sender associated with toll ticketing adapter 120, which manifests the first digit of the directory number of the calling subscriber, are applied to conductor SMK of cable 150. Each of these ground pulses is effective in operating mark relay 7MK, and second mark relay 7MKS controlled thereby, through a connection extending from conductor SMK of cable 150, operated contacts 8SD2, step position "8" of bank 11PSB of the programming switch, and the operating winding of mark relay 7MK in parallel with resistor 7R1 to grounded battery. The operation of mark relay 7MK and second mark relay 7MKS result in the recording of a series of spaced marked pulses on the magnetic tape equal in number to the number of ground pulses in the first series applied to conductor SMK.

Immediately following the recording of the first series of pulses, a ground pulse, generated by the identifier sender associated with toll ticketing adapter 120, is applied to conductor SSP of cable 150. This ground pulse applied to conductor SSP of cable 150 is effective in energizing space relay 7SP, and second space relay 7SPS controlled thereby, over a connection extending from conductor SSP through operated contacts 8SD3 and the operating winding of space relays 7SP in parallel with resistor 7R3 to grounded battery. Space relay 7SP and second space relay 7SPS operate in the manner previously described to record a space pulse on the magnetic tape.

In a similar manner, additional series of mark pulses, manifesting the remaining digits of the directory number of the calling subscriber, followed by a space pulse, are sequentially recorded on the magnetic tape.

Following the completion of the recording of the directory number of the calling subscriber, the identifier sender serving toll ticketing adapter 120 is disassociated therefrom, removing holding ground from the H conductor of cable 150. This causes the deenergization and restoration of start identification relay 8SD.

In restoring, start identification relay 8SD opens contacts 8SD1 thereof, thereby breaking the energization path for shunt relay 3SH. Shunt relay 3SH therefore restores, and a short period thereafter second shunt relay 2SHS, controlled thereby, also restores. As previously described, during the period between the restoration of shunt relay 3SH and the restoration of second shunt relay 3SHS, an operating path is completed for X drive magnet 11PSX. This results in the wipers of the programming switch being stepped to the number "9" position thereof.

When clock and calendar circuit 154, shown in Fig. 1, is not in the process of transmitting time and date information to a toll ticketing adapter, it applies ground to conductor CPU over cable 152. In response to the wiper of bank 10PSA of the programming switch being stepped to position "9" thereof, the appearance of ground on the CPU conductor of cable 152 causes an energizing path to be established for pickup relay 8PU, which path extends from the CPU conductor, through operated contacts 6SR6, the number "9" step position of bank 10PSA of the programming switch, normally closed contacts 2SHS2 and 8PU4, and the operating winding of pickup relay 8PU to grounded battery. Therefore, pickup relay 8PU operates, closing normally open contacts 8PU1, 8PU2, 8PU3, 8PU5 and 8PU6, respectively, thereof, and opening normally closed contacts 8PU4 thereof. The opening of contacts 8PU4 breaks the just described operating path for pickup relay 8PU, but, due to the concurrent closure of contacts 8PU5, pickup relay 8PU is maintained operated by the presence of a holding ground normally applied to conductor CHD of cable 152 by clock and calendar circuit 154.

The closure of contacts 8PU6 provides an operating path for shunt relay 3SH extending from ground through operated contacts 8PU6, resistor 8R1, and the operating winding of shunt relay 3SH in parallel with resistor 3R2 to grounded battery. Therefore, shunt relay 3SH, and second shunt relay 2SHS controlled thereby, operate in the manner previously described. Second shunt relay 2SHS, in operating, opens normally closed contacts 2SHS2, to thereby further break the energizing path for pickup relay 8PU.

The closure of contacts 8PU2 is effective in applying ground through clock and calendar start conductor CST of cable 152. The presence of ground on conductor CST causes clock and calendar circuit 154 to sequentially apply a plurality of series of grounded pulses manifesting time and date information to conductor CMK of cable 152, and to further apply a ground pulse following each series to conductor CSP of cable 152.

Each of the ground pulses applied to CMK is effective in energizing mark relay 7MK, and second mark relay 7MKS controlled thereby, over a connection extending from conductor CMK, operated contacts 8PU1, step position number "9" of bank 11PSB of the programming switch, and mark relay 7MK in parallel with resistor 7R1 to grounded battery. Each pulse applied to conductors CSP is effective in operating space relay 7SP, and second space relay 7SPS controlled thereby, over a connection extending from conductor CSP, operated contacts 8PU3, and the operating winding of space relay 7SP in parallel with resistor 7R3 to grounded battery.

As heretofore described, each operation of the mark relays causes a mark pulse to be recorded on the magnetic tape, and each operation of the space relays causes a space pulse to be recorded on the magnetic tape. Thus, the time and date information supplied by clock and calendar circuit 154 is recorded on the magnetic tape.

In response to clock and calendar circuit 154 having completed the process of supplying all the time and date information, holding ground is momentarily removed from conductor CHD. The removal of holding ground permits pickup relay 8PU to restore before holding ground is reapplied to conductor CHD. In restoring, contacts 8PU6 of pickup relay 8PU are reopened, breaking the energizing circuit for shunt relay 3SH. Therefore, shunt relay 3SH restores, and a short time later second shunt relay 2SHS controlled thereby restores. During the interim between the restoration of shunt relay 3SH and second shunt relay 2SHS, in the manner previously described, an energizing path is established for X drive magnet 11PSX. Therefore, the wipers of the programming switch are stepped forward to the number "0" position thereof.

In response to the wiper of bank 11PSB of the programming switch being stepped to the number "0" position thereof, an energizing path is prepared for mark relay 7MK, which path extends from ground, through operated contacts 2RD2 and 6SRS8, normally open timer minute contacts 11TM1, the "0" position of bank 11PSD of the programming switch, and the operating winding of mark relay 7MK in parallel with resistor 7R1 to grounded battery. Therefore, when timer minute contacts 11TM1 are momentarily closed, in response to the first cycle thereof being completed, mark relay 7MK, and second mark relay 7MKS controlled thereby, are operated over the previously prepared path for energizing mark relay 7MK. Thus, in the manner previously described, a mark pulse is recorded on the magnetic tape. In a similar manner, so long as the call continues, a mark pulse is recorded on the magnetic tape once each minute.

Should the calling subscriber hang up first at the end of the call, calling bridge 2CB will restore, opening contacts 2CB2 thereof and closing contacts 2CB3 thereof. The opening of contacts 2CB2 breaks the operating path for release delay relay 2RD, which being slow to release does not release until a short time thereafter. The closure of contacts 2CB3 is effective in energizing shunt relay 3SH, and second shunt relay 2SHS controlled thereby, over a connection extending from ground through reclosed contacts 2CB3, the number "0" step position of bank 11PSC of the programming switch, operated contacts 3RD1, normal contacts 8RS1, and the operating winding of shunt relay 3SH in parallel with resistor 3R2 to grounded battery.

Release delay relay 2RD, which was deenergized by the restoration of calling bridge 2CB, now restores, opening contacts 2RD1, 3RD1, 3RD3 and 3RD4, respectively, thereof, and closing contacts 3RD2 and 3RD5, respectively, thereof. The opening of contacts 2RD1 breaks the energizing path for release delay slave relay 2RDS. The opening of contacts 2RD2 removes the operating ground for timer minute contacts 11TM1. The opening of contacts 3RD1 breaks the previously described energizing path for shunt relay 3SH. The opening of contacts 3RD3 removes marking ground from conductor S3, thereby releasing the preceding equipment.

Shortly thereafter, release delay slave relay 2RDS and shunt relay 3SH restore. The restoration of release delay slave relay 2RDS is effective in reopening contacts 2RDS1, 2RDS4, 2RDS5, 3RDS1, 3RDS3, and 3RDS4, respectively, thereof, and reclosing contacts 2RDS2, 2RDS3, 3RDS2, and 3RDS4, respectively thereof. The opening of contacts 2RDS1 and 2RDS4 break the loop between conductors T4 and R4, causing the succeeding equipment to be released. The opening of contacts 2RDS5 removes the holding ground for second supervisory relay 6SRS, causing this relay to restore. The opening of contacts 3RDS1 removes the holding ground for supervisory relay 6SR, causing this relay to restore. The opening of contacts 3RDS4 removes the operating ground for monitor lamp 3L, so that monitor lamp 3L extinguishes. The closure of contacts 2RDS2 is effective in reapplying marking ground through still operated contacts 10EC2 to conductor S3, to prevent toll ticketing adapter 120 from being seized by another calling subscriber.

The restoration of shunt relay 3SH reopens contacts 2SH2 thereof, breaking the operating path for second shunt relay 2SHS, which, due to its slow release characteristics, does not restore until a short period thereafter. Since second supervisory relay 6SRS has restored, the previously described operating ground, through normally closed contacts 7SRS5, for space relay 7SP is re-established during the interim period between the restoration of shunt relay 3SH and the restoration of second shunt relay 2SHS. Therefore, space relay 7SP, and second space relay 7SPS controlled thereby, operate in the manner previously described to record a space pulse on the magnetic tape following the recording of the mark pulses manifesting the duration of the call. Also, the previously described operating path for X drive magnet 11PSX is re-established during the interim period between the restoration of shunt relay 3SH and the restoration of second shunt relay 2SHS. However, since the wipers of the programming switch have already been advanced to the last step position thereof, the operation of X drive magnet 11PSX is ineffective in further stepping the wipers of the programming switch.

In response to second shunt relay 2SHS also restoring, an operating path for Z restoration magnet 11PSZ of the programming switch is established, this operating path extending from ground through now closed contacts 3SH1, 3SHS2 and 3RD2, operated programming switch off normal contacts 11PSON1, now closed contacts 7SRS4, and the operating winding of Z restoration magnet 11PSZ to grounded battery. The operation of Z restoration magnet 11PSZ is effective in retaining the wipers of the programming switch to their respective normal positions, thereby reopening off normal contacts 11PSON1 and 11PSON2, respectively.

The opening of off normal contacts 11PSON1 breaks the operating path for Z restoration magnet 11PSZ. The opening of off normal contacts 11PSON2 breaks the operating path for off normal relay 11ONR. Off normal relay 11ONR therefore restores, reopening contacts 11ONR2 thereof, and reclosing contacts 10ONR1, 11ONR1, 11ONR3, and 11ONR4, respectively, thereof.

The opening of contacts 11ONR2 breaks the operating path for end of call relay 11EC. However, end of call relay 11EC is maintained operated for a considerable time by the charge present on capacitor 11C2, which discharges through resistor 11R1 and the operating winding of end of call relay 11EC.

The closure of contacts 11ONR1 provide an operating path for differentially connected pulse generator relay 11PG, which path extends from ground through now closed contacts 11ONR1, operated contacts 11EC1, normally closed 11PG1 and 4ALM1, and both the upper winding of pulse generator relay 11PG to grounded battery and the lower winding of pulse generator relay 11PG and capacitor 11C2 to grounded battery. Since pulse generator relay 11PG is differentially connected, it does not operate until the current through the lower winding thereof is reduced sufficiently by the charge built up on capacitor 11C2.

In operating, pulse generator relay 11PG closes normally open contacts 10PG1, 11PG2, 11PG3, and 11PG4, respectively, thereof, and opens normally closed contacts 11PG1, thereof.

The closure of contacts 11PG3 provides a direct path for energizing mark head 13MKH of the recorder, this path extending from ground through operated contacts 11EC2, normally closed contacts 11COE2, operated contacts 11PG3, normally closed contacts 5CS10, conductor MKH, mark head 13MKH, conductor MKC, normally closed contacts 5CS13, and resistor 5R4 to grounded battery. At the same time, a direct energizing path is established for space head 13SPH of the recorder, which path extends from ground through operated contacts 11EC2, normally closed contacts 11COE2, operated contacts 11PG4, normally closed contacts 5CS8, conductor SPH, space head 13SPH, conductor SPC, normally closed contacts 5CS7, and resistor 5R3 to grounded battery.

The closure of contacts 10PG1 provides an operating path for Coe relay 10COE extending from ground through operated contacts 10PG1 and the operating winding of Coe relay 10COE to grounded battery. Coe relay 10COE therefore operates, closing normally open contacts 10COE1 and 11COE1, respectively, thereof, and opening contacts 11COE2 thereof. The closure of contacts 10COE1 provides a holding ground for Coe relay 10COE extending from ground through operated contacts 10EC1 and 10COE1, the operating winding of Coe relay 10COE to grounded battery. The opening of contacts 11COE2 breaks the just described energizing paths for mark head 13MKH and space head 13SPH. This concurrent energization of mark head MKH and space head SPH is effective in recording coincident mark and space pulses, called a COE signal, which manifests the end of a call.

The closure of contacts 11COE1 is effective in energizing ratchet drive magnet 13RDM over a connection extending from ground, operated contacts 11EC2, 11COE1 and 11PG2, conductor RA, ratchet drive magnet 13RDM, normally closed clutch magnet interrupter contacts CLMI to grounded battery. Therefore, the magnetic tape is moved one step forward.

The opening of contacts 11PG1 breaks the previously described operating path for pulse generator relay 11PG. However, pulse generator relay 11PG does not restore immediately due to the discharge of capacitor 11C2 through the lower and upper windings thereof to grounded battery. However, when capacitor 11C2 has discharged sufficiently, pulse generator relay 11PG does restore, reclosing contacts 11PG1, thereby reestablishing the operating path therefor to reoperate pulse generator relay 11PG. Since Coe relay 10COE is maintained operated over the above-described holding ground therefor, mark head 13MKH and space head 13SPH are not reenergized in response to the reoperation of pulse generator relay PG, but ratchet drive magnet 13RDM is again operated to move the magnetic tape another step forward. The sequential opening and closing of pulse generator relay 11PG continues, thereby repeatedly advancing the magnetic tape, until end of call relay 11EC finally restores, reopening contacts 10EC1, 10EC2, 11EC1, 11EC2, and 11EC4, respectively, thereof, and reclosing contacts 11EC3 thereof. The opening of contacts 11EC1 permanently breaks the operating path for pulse generator relay 11PG. The opening of contacts 11EC2 removes the operating ground for the ratchet drive magnet. The opening of contacts 10EC1 removes the holding ground for Coe relay 10COE, which then restores. The opening of contacts 10EC2 removes marking ground from conductor S3, so that toll ticketing adapter 120 is now returned to its initial state, and may be seized by another calling subscriber.

Should the called subscriber hang up first, thereby removing the answer supervision signal, supervisory relay 6SR, which is energized by the answer supervision signal, will restore. In restoring, supervisory relay 6SR opens contacts 6SR1, thereby deenergizing timer motor 6TM. Since timer minute contacts 11TM1 are controlled by timer motor 6TM, the deenergization of timer motor 6TM prevents any further duration mark pulses from being recorded, so that the calling subscriber will not be overcharged. Nothing further happens until the calling subscriber hangs up, whereupon toll ticketing adapter 120 operates in the same manner, previously described, as when the calling subscriber hangs up first.

If the calling subscriber should hang up prior to dialing the full complement of directive signals, toll ticketing circuit 120 will operate in the same manner and with the same effect as previously described to record a Coe signal followed by a run off of the magnetic tape. However, since in this case the items of billing information manifesting the identity of the calling subscriber and the time and date of the call have not been recorded prior to the recording of the Coe signal, on playback, a toll ticket will not be printed by the readout facilities, and the calling subscriber will therefore not be charged.

However, should the calling subscriber hang up after dialing the full complement of directive signals, and after the no charge interval provided by timer NCI contacts 10TM1 in response to the return of an answer supervision signal, but before the identity of the directory number of the calling subscriber has been recorded, it is essential that toll ticketing adapter 120 remain operated until the items of information necessary to charge the calling subscriber have been recorded. Since under these circumstances, the wipers of the programming switch have been advanced to the number "8" position thereof, toll ticketing adapter 120 is maintained operated by providing an alternate operating path for release delay relay 2RD, which alternate path extends from ground through normally closed contacts 2CB3 of calling bridge relay 2CB, the number "8" step position of bank 11PSC of the programming switch, operated contacts 7SRS1, and the operating winding of release delay 2RD to grounded battery. Therefore, if the programming switch is in its number "8" step position and second supervisory relay 6SRS has been operated, the restoration of calling bridge relay 2CB, in response to the calling subscriber hanging up, results in contacts 2CB3 being reclosed, thereby completing the just described alternate operating path for release delay relay 2RD. The toll ticketing adapter now operates as previously described to call in the identification circuitry and record the directory number of the calling subscriber, and thereafter advance the wipers of the programming switch to the number "9" step position thereof. In response to the wipers of the programming switch being advanced to the number "9" step position thereof, the previously described alternate operating path for release delay relay 2RD is broken. Therefore, the release delay relay 2RD, and release delay slave relay 2RDS controlled thereby, now restore.

In restoring, release delay relay 2RD reopens contacts 3RD3 thereof, removing marking ground from conductor S3, thereby releasing the preceding equipment. However, the later restoration of release delay slave relay 2RDS recloses contacts 2RDS2 thereof, to thereby reapply marking ground through still operated contacts 10EC2 to conductor S3.

In response to the wipers of the programming switch being advanced to the number "9" step position thereof, an alternate operating path is established for second supervisory relay 6SRS, which path extends from ground through normally closed contacts 2CB3, the number "9" step position of bank 11PSC of the programming switch, operated contacts 6SRS7, and the operating winding of second supervisory relay 6SRS. Therefore, second supervisory relay 6SRS remains operated, maintaining contacts 7SRS4 thereof open. Since contacts 7SRS4 form part of the operating path for Z restoration magnet 11PSZ, the programming switch cannot be restored to normal at this time. Toll ticketing circuit 120 now operates in the manner previously described to call in clock and calendar circuit 154 and record time and date information on the magnetic tape, and thereafter advance the wipers of the programming switch to the number "0" step position thereof.

In response to the wipers of the programming switch being advanced to the number "0" step position thereof, the just described alternate operating path for second supervisory relay 6SRS is broken. Therefore, second supervisory relay 6SRS restores, reclosing contacts 7SRS4 thereof, permitting the completion of the operating path for Z restoration magnet 11PSZ, so that the programming switch may now restore to its normal position.

In response to the programming switch being restored to its normal position, toll ticketing adapter 120 operates in the manner previously described to record a Coe signal and to provide a run off of the magnetic tape.

Should the wipers of the programming switch be advanced to the number "9" step position, the directory number of the calling subscriber having already been recorded at the time that the calling subscriber hangs up, toll ticketing adapter 120 will still operate in the manner just described to record the time and date information.

Since sometimes it is desired to employ automatic toll ticketing in a telephone system which makes no provision for returning an answer supervision signal, toll ticketing adapter 120 is equipped with means for providing an artificial answer supervision signal. In this case, the artificial supervision key, shown in Fig. 10, is operated, so that in response to the dialing of the full complement of directive signals, whereby the wipers of the programming switch are advanced to the number "8" step position thereof, supervisory relay 6SR is energized over a path extending from grounded battery through resistor 10R1, operated contacts 10AS1 of the artificial supervision key, the operating winding of supervisory relay 6SR, normally closed contacts 7SRS2, operated contacts 10AS4 of the artificial supervision key, step position "8" of bank 11PSD of the programming switch, and operated contacts 3RDS1 to ground. Supervisory relay 6SR therefore operates, closing contacts 6SR1 thereof, thereby energizing timer motor 6TM, which operates in the manner previously described to effect the operation of timer NCI contacts 10TM1. If the calling subscriber maintains the call for more than the no charge interval provided by timer NCI contacts 10TM1, timer NCI contacts 10TM1 close, thereby energizing second supervisory relay 6SRS. In response to the operation of second supervisory relay 6SRS, contacts 7SRS2 are opened, breaking the just described operating path for supervisory relay 6SR. However, contacts 7SRS3 are concurrently closed to provide a holding ground for supervisory relay 6SR through operated contacts 3RDS1 and operated contacts 7SRS3.

Toll ticketing adapter 120 now operates in the manner previously described to record the directory number of the calling subscriber, time and date information, and the duration of the call, so that the calling subscriber may be charged therefor.

It is possible during the recording of items of information that the magnetic tape will become filled, so that additional items cannot be recorded thereon. Therefore, toll ticketing adapter 120 includes means, comprising tape control contact 13TCC, tape contact relay 13TC, and first and second perforation relays 9TA and 9TB, respectively, for preventing the further recording of additional items of information when the magnetic tape is full. Since these means do not form part of the present invention, and they are fully disclosed in the above-identified application of Clement and Harris, they will not be described in detail here. Briefly, however, in response to the first perforation on the magnetic tape passing tape control contact 13TCC, tape control relay 13TC is operated, which, in turn, causes the operation of first perforation relay 9TA, thereby closing contacts 8TA1 thereof. The closure of contacts 8TA1 are effective in applying marking ground to conductor S3 through operated contacts 8TA1 and normally closed contacts 2RDS2. The presence of marking ground on conductor S3 prevents toll ticketing adapter 120 from being seized by another calling subscriber.

If a call which is in progress at the time that first perforation relay 9TA is operated should continue until the second perforation on the magnetic tape passes tape control contact 13TCC, tape contact relay 13TC will be again operated and will, this time, cause second perforation relay 13TC to be operated, opening contacts 12TB1. The opening of contacts 12TB1 results in breaking the operating path for calling bridge relay 2CB and in breaking the loop between conductors T4 and R4. Therefore, the call in progress is forcibly disconnected. Since first perforation relay 9TA remains operated, marking ground is applied to conductor S3, as previously described, so that no other calling subscriber can seize toll ticketing adapter 120.

The operation of toll ticketing adapter 120 on playback will now be considered. As mentioned earlier, this invention contemplates the preferred use of the improved playback means disclosed in the application of B. A. Harris, Serial No. 611,218, filed September 21, 1956.

Normally, playback circuit means 156, shown in Fig. 1, applies ground to toll ticketing adapter 120 over conductor EMB, shown in Fig. 4 of cable 160. This ground is applied to conductor C, shown in Fig. 5, over a connection extending from conductor EMB, normally closed contacts 8HM8, 4CA3 and 4ALM3, then through normally closed contacts 4PBY3 of the playback busy switch to conductor C. As shown in Fig. 1, conductor C returns this ground back to playback circuit means 156 over a connection individual to toll ticketing adapter 120.

However, in response to clock and calendar circuit 154 applying a signal to playback circuit means 156 over conductor 158, all shown in Fig. 1, playback circuit means 156 removes ground from conductor EMB of cable 160. Assuming that the playback busy switch is not operated, the removal of ground from conductor EMB is effective in removing ground from conductor C over the previously described connection between these two conductors. Playback circuit means 156 is then sequentially associated with each toll ticketing adapter, such as toll ticketing adapter 120, and in response to absence of ground on the C conductor individual thereto, is effective in applying ground to conductor CS, shown in Fig. 4, which, as shown in Fig. 1, extends from playback circuit means 156 to toll ticketing adapter 120, and is individual thereto.

If the playback switch is operated, normally closed contacts 4PBY1 and 4PBY3, respectively, thereof are opened, and normally opened contacts 4PBY2 and 4PBY4, respectively, thereof are closed. The closure of contacts 4PBY2 is effective in placing marking ground on conductor S3, preventing a calling subscriber from seizing toll ticketing adapter 120. The opening of contacts 4PBY3 breaks the previously described connection between the EMB and C conductors, but the concurrent closure of contacts 4PBY4 places a ground on conductor C which is independent of the presence of ground on conductor EMB of cable 160. In this case, the removal of ground from the EMB conductor of cable 160 during playback, which was previously described, will be ineffective in removing ground from conductor C. Since, as previously described, playback circuit means 156 associates itself with toll ticketing adapter 120 and applies ground to conductor CS only in response to the absence of ground on conductor C, in this case, playback circuit means 156 will pass by toll ticketing adapter 120.

Assuming, however, that the playback busy switch has not been operated, and that playback circuit means 156 has been associated with toll ticketing adapter 120, ground will be applied to conductor CS. In response to ground being applied to conductor CS, camp relay 4CA is operated over a connection from conductor CS through the operating winding of camp relay 4CA to grounded battery.

Camp relay 4CA therefore operates, closing normally open conductors 4CA1, 4CA2, 4CA4, and 5CA1, respectively, thereof, and opening normally closed contacts 4CA3 thereof. The closure of contacts 4CA4 is effective in applying ground to conductor C over a connection extending from ground, through normally closed contacts 13TD1 or 4CSS3, operated contacts 4CA4, normally closed contacts 4ALM3 and 4PBY3 of the playback busy switch to conductor C. This application of ground to conductor C causes playback circuit means 156 to switch through to toll ticketing adapter 120.

The closure of contacts 4CA1 is effective in applying marking ground to conductor S3 over a connection extending from ground through operated contacts 4CA1, normally closed contacts 2RDS2 and 4PBY1 of the playback busy switch, thereby preventing toll ticketing adapter 120 from being seized by the calling subscriber during playback. However, this marking ground is prevented by rectifier 2RF1, connected as shown, from being applied to conductor S4.

If toll ticketing adapter 120 is in the process of recording billing information of a call in progress or just ended and the time that playback circuit means 156 is associated therewith, at least one of relays 2RD and 11EC will be in an operated condition. Should this be the case, ground will be applied to conductor PD of cable 160 over a connection extending from ground through normally closed contacts 11EC2, operated contacts 3RD4 and 4CA2, and normally closed contacts 4PB4 to conductor PD, shown in Fig. 4 of cable 160, if only relay 2RD is operated, or over a connection extending from ground through operated contacts 11EC4 and 4CA2, and normally closed contacts 4PB4 to conductor PB, if relay 11EC is in an operated condition.

In response to ground being applied to conductor PD, in the manner just described, playback circuit means 156 will wait for a predetermined period, such as from 6 to 8 minutes. If both relays 2RD and 11EC have not restored during this period, indicating that the recording of billing information pertaining to the call in progress has not been completed, playback circuit means 156 will disassociate itself from toll ticketing adapter 120 and associate itself with the next toll ticketing adapter.

However, should no call be in progress or just ended at the time that playback circuit means 156 is associated with toll ticketing adapter 120, so that relays 2RD and 11EC are in a restored condition, or if the recording of billing information relating to a call in progress at the time that playback circuit means 156 is associated with toll ticketing adapter 120 is completed prior to the end of the waiting period, so that both relays 2RD and 11EC restore, an energizing path for clutch switch relay 5CS is established, this path extending from ground through normally closed contacts 11EC3 and 3RD5, operated contacts 5CA1, and the operating winding of clutch switch relay 5CS to grounded battery. Clutch switch relay 5CS therefore operates, closing normally open contacts 4CS2, 5CS1, 5CS3, 5CS4, 5CS5, 5CS6, 5CS9, 5CS11, 5CS12, 5CS14, 5CS15, and 5CS16, respectively, thereof, and opening normally closed contacts 4CS1, 5CS2, 5CS7, 5CS8, 5CS10, and 5CS13, respectively, thereof.

The closure of contacts 5CS16 applies a holding ground for clutch switch relay 5CS extending from ground through operated contacts 5CS16 and 5CA1, and the operating winding of clutch switch relay 5CS to grounded battery.

The absence or removal of ground from conductor PD of cable 160 causes playback control circuit means 156 to terminate the previously described 6 to 8 minute timing cycle and to initiate a second timing cycle of predetermined duration, such as 2 to 4 minutes, within which time the homing of the magnetic tape, which is described below, should be completed.

In response to the closure of contacts 5CS3 an energizing path is established for homing relay 9HM extending from ground, normally closed contacts 5ALM2, operated contacts 5CS3, normally closed contacts 4CSS1, 4PB2 and 3RDS6, and the operating winding of homing relay 9HM to grounded battery.

Homing relay 9HM therefore operates, closing normally open contacts 8HM2, 8HM3, 8HM5, 8HM6, 9HM1, 9HM2, and 9HM3, respectively, thereof, and opening normally closed contacts 8HM1, 8HM4, and 8HM7, respectively, thereof.

The closure of contacts 9HM2 causes the application of ground to a playback motor control circuit (not shown), which is fully described in the above-identified application of Clement and Harris, over a connection extending from ground through normally closed contacts 13TD5, operated contacts 9HM2, and motor high speed conductor MHS, shown in Fig. 14. In response thereto, a playback motor (not shown) rotates a shaft in the recorder at high speed.

The closure of contacts 9HM3 and the previous closure of contacts 5CS15 of clutch switch relay 5CS provide alternate energizing paths for clutch magnet 13CLM of the recorder extending from ground through operated contacts 5CS16, normally closed contacts 14TD1, operated contacts 9HM3 or normally closed contacts 5PB3 and operated contacts 5CS15, normally closed contacts CSS3, conductor CL and clutch magnet 13CLM to grounded battery. In response to the energization thereof, clutch magnet 13CLM couples the shaft of the playback motor, to thereby move the continuous tape in a forward direction toward its home position. In operating, clutch magnet 13CLM opens interrupter contacts thereof 13CLMI, thereby insuring that ratchet drive magnet 13RDM is rendered inoperative at this time.

The magnetic tape continues to move in a forward direction until the first of the three perforations is contacted by tape control contacts 13TCC, thereby providing an energization path for tape contacts 13TC extending from ground through operated contacts 13TCC and the operating winding of tape contact relay 13TC in parallel with resistor 13R3 to grounded battery. Therefore, tape contact relay 13TC operates, closing contacts 13TC1 thereof.

The closure of contacts 13TC1 are effective in providing an energization path for the lower winding of two-step first perforation relay 9TA extending from ground through operated contacts 13TC1, normally closed contacts 9TA3 and the operating winding of first perforation relay 9TA to grounded battery. Therefore, first perforation relay 9TA operates to close its preliminary normally open contacts 9TA1. Closure of contacts 9TA1 provides a shunting ground across the upper winding of first perforation relay 9TA extending from ground through normally closed contacts 4PB5 or operated contacts 8HM6, operated contacts 9TA1, the upper winding of first perforation relay 9TA, normally closed contacts 9TA3, operated contacts 13TC1, back to ground. However, in response to the first perforation on the magnetic tape having passed tape control contacts 13TCC, the operating path for tape contact relay 13TC is broken, thereby reopening contacts 13TC1 to break the just described ground shunt on the upper winding of first perforation relay 9TA. This causes two-step first perforation relay 9TA to fully operate over the connection extending from ground through normally closed contacts 4PB5 and operated contacts 8HM7, operated preliminary contacts 9TA1, the upper and lower windings in series of first perforation relay 9TA to grounded battery.

The full operation of first perforation relay 9TA opens contacts 9TA3 thereof, and closes contacts 9TA2 thereof. The closure of contacts 9TA2 prepares an energization path for two-step second perforation relay 13TB through normally closed contacts 13TB3. Since first and second perforation relays 9TA and 13TB are similarly connected, second perforation relay 13TB will effect the closure of contacts 13TB2, thereby preparing energizing path for third perforation relay 13TD. Third perforation relay 13TD, which is also connected to operate in the same manner as first perforation relay 9TA, in response to the third perforation of a magnetic tape passing tape control contacts 13TCC, is then operated.

The operation of third perforation relay 13TD, is effective in opening normally closed contacts 12TD1, 13TD1, 13TD2, 13TD5, and 14TD1, respectively, thereof, and closing normally open contacts 13TD4 thereof.

The closure of contacts TD4 provide an operating path for playback relay 5PB extending from ground through operated contacts 5CS4 and 13TD4, the operating winding of playback relay 5PB to grounded battery. Therefore, playback relay 5PB operates, closing normally open contacts 4PB1, 4PB3, 5PB1, and 5PB2, respectively, thereof, and opening normally closed contacts 4PB2, 4PB4, 4PB5, and 5PB3, respectively, thereof.

The closure of contacts 5PB2 provides a holding ground for playback relay 5PB extending from ground through operated contacts 5CS4 and 5PB2, and the operating winding of playback relay 5PB to grounded battery.

The opening of contacts 4PB5 removes one of the operating and holding grounds for first, second and third perforation relays 9TA, 13TB and 13TD, respectively.

The opening of contacts 4PB2 breaks the previously described operating path for homing relay 9HM. Therefore, homing relay 9HM restores.

In restoring, homing relay 9HM reopens contacts 9HM2 thereof, thereby breaking the previously described energizing path over conductor MHS to the playback motor control circuit. This causes the playback motor, which has been rotating at high speed, to stop, thereby stopping the forward movement of the magnetic tape.

The reopening of contacts 8HM6 breaks the previously described operating and holding path for first, second and third perforation relays 9TA, 13TB and 13TD, respectively, causing these relays to restore.

Figure 5:
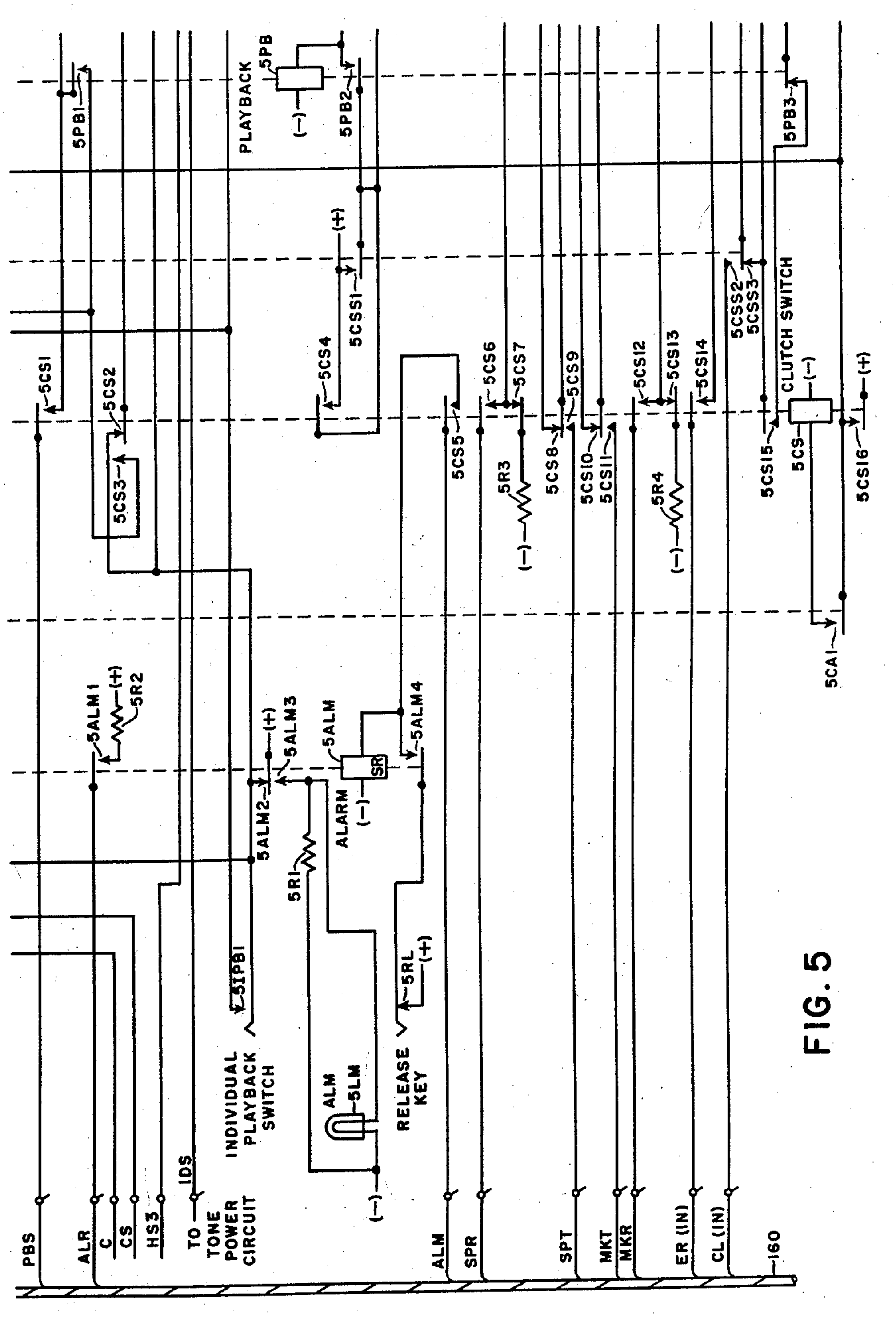
Figure 6:
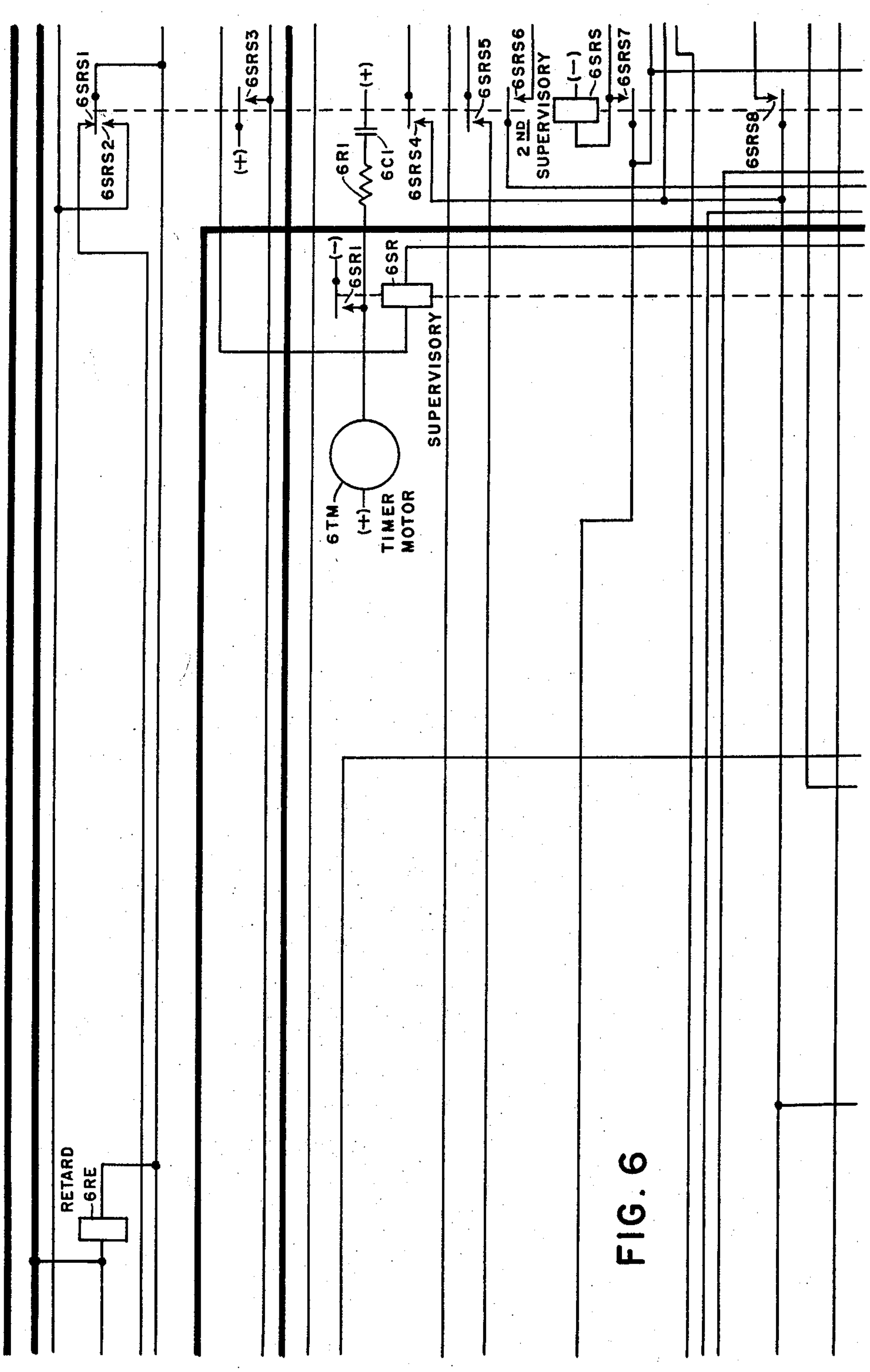
Figure 7:
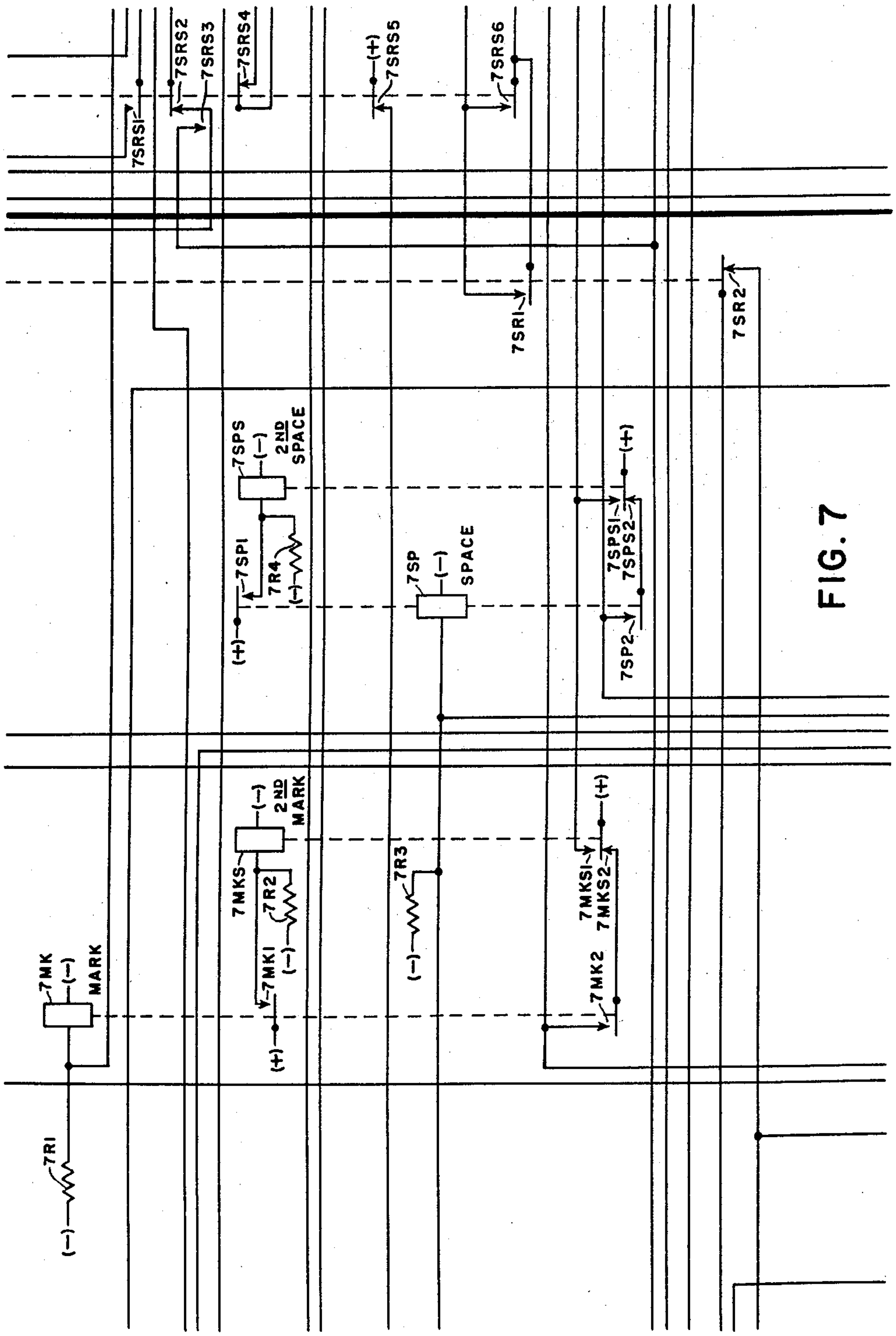
Figure 8:
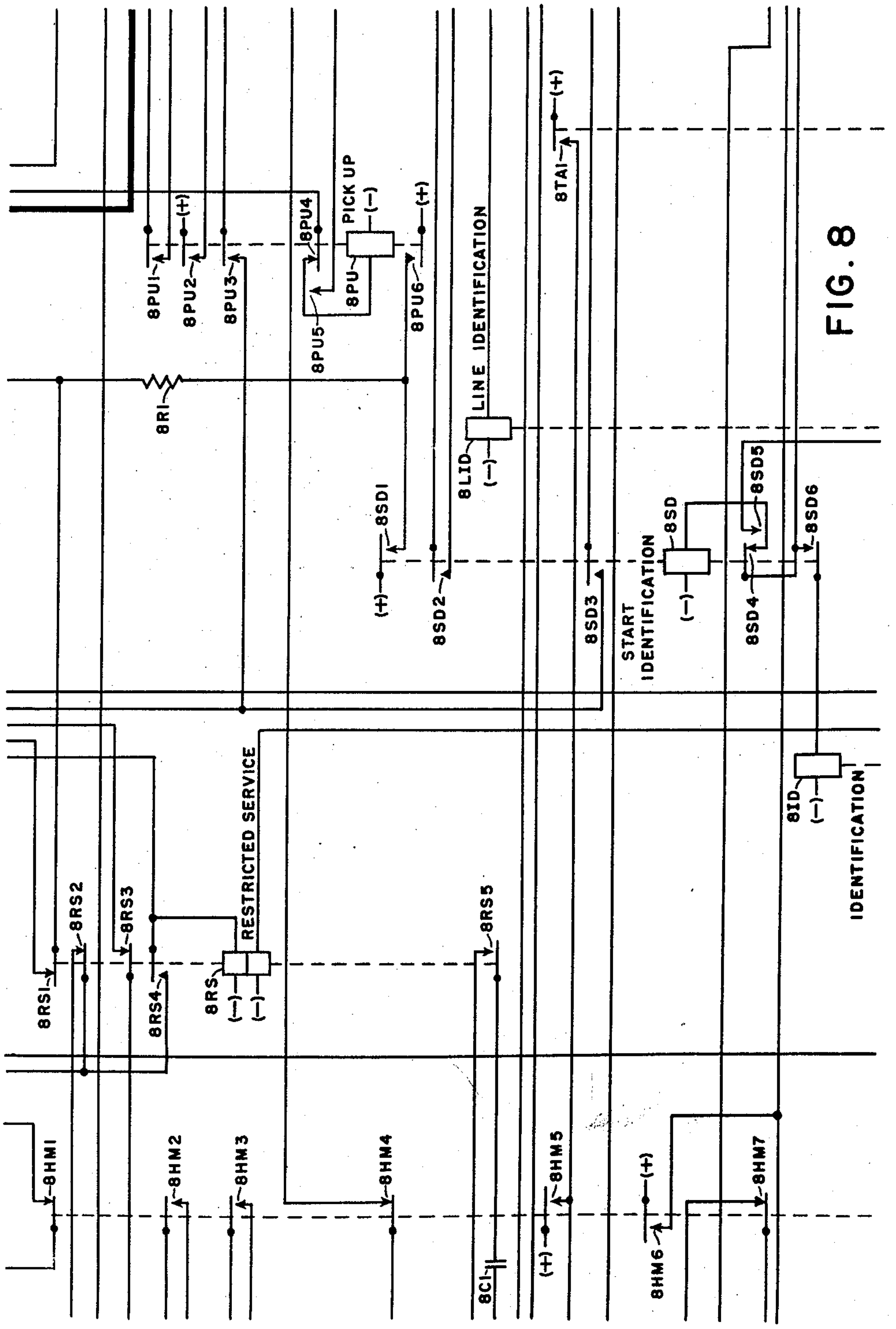
Figure 9:
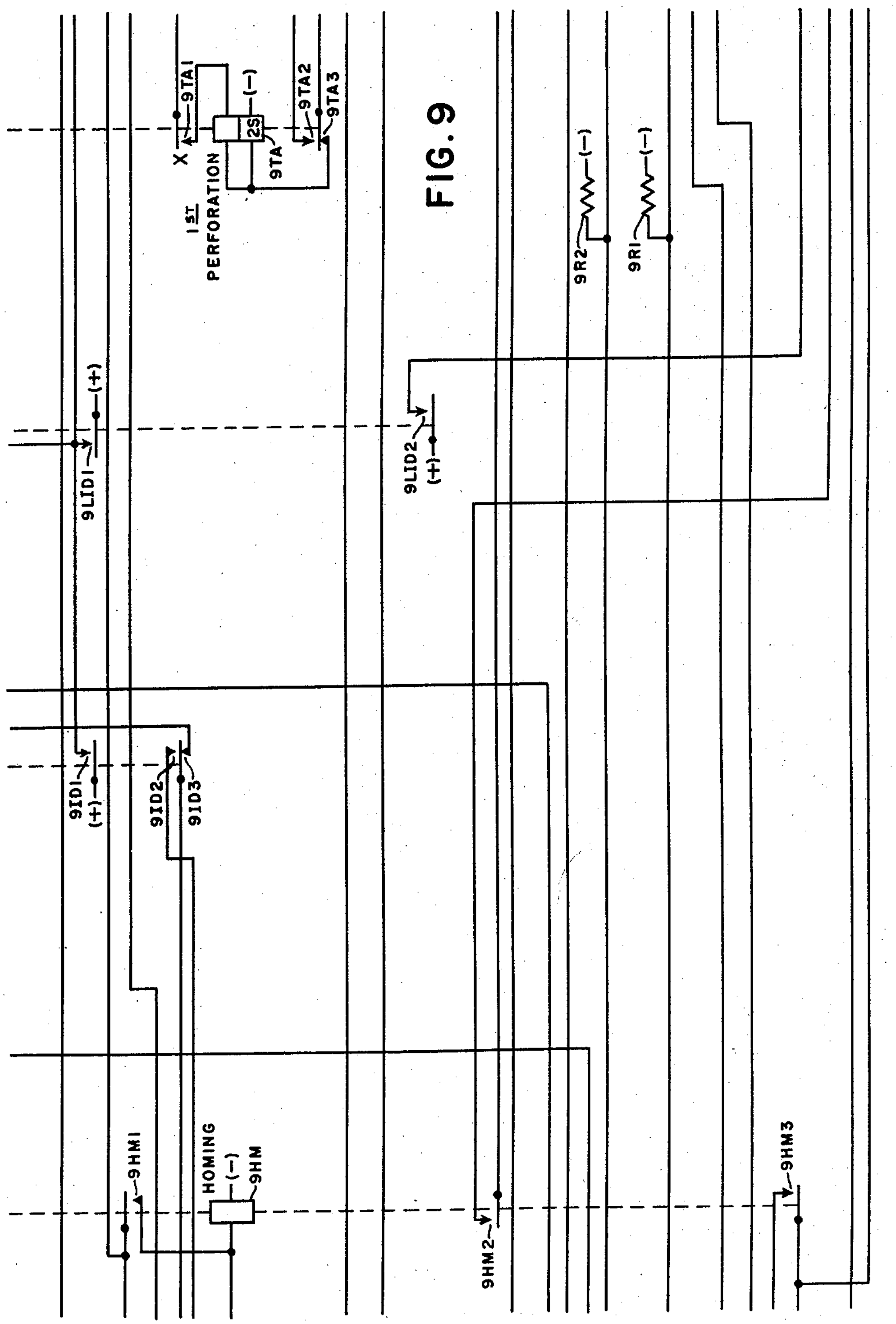

The closure of contacts 5PB1, in response to the operation of playback relay 5PB, causes ground to be applied to playback start conductor PBS, shown in Fig. 5, of cable 160, over a connection extending from ground through normally closed contacts 5ALM2, operated contacts 5CS3, 5PB1 and 5CS1 to the playback start conductor. The closure of contacts 5PB1 also provides an energizing path for clutch switch slave relay 4CSS over a connection extending from ground through normally closed contacts 5ALM2, operated contacts 5CS3 and 5PB1, now reclosed contacts 12TD1 and 8HM4, and the operating winding of clutch switch slave relay 4CSS to grounded battery. Therefore, clutch switch slave relay 4CSS operates, opening normally closed contacts 4CSS1, 4CSS3, and 5CSS3, respectively, thereof, and closing normally open contacts 4CSS2, 4CSS4, 5CSS1, and 5CSS2, respectively, thereof.

At this time, space head 13SPH is connected to playback circuit means 156 over a connection extending from conductor SPR of cable 160, operated contacts 5CS6, conductor SPC, space head 13SPH, conductor SPH, operated contacts 5CS9, and conductor SPT of cable 160. Mark head 13MKH is connected to playback circuit means 156 over a connection extending from conductor MKT of cable 160, operated contacts 5CS11, conductor MKH, mark head 13MKH, conductor MKC, operated contacts 5CS12, and conductor MKR of cable 160. Erase head 13ERH is connected to playback circuit means 156 through a connection extending from conductor ER(IN) of cable 160, operated contacts 5CS14, conductor ER, erase head 13ERH to grounded battery. Clutch magnet 13CLM is connected to playback circuit means 156 over a connection extending from conductor CL(IN) of cable 160, operated contacts 5CS2, conductor CL, and clutch magnet 13CLM to grounded battery.

In response to the previously described ground on playback start conductor PBS of cable 160, playback circuit means 156 is operated to initiate and control the playback of the recorded billing information on the magnetic tape.

The first information to be played back is a preliminary Coe signal which was recorded on the magnetic tape at the end of the previous playback thereof in a manner described below. This preliminary Coe signal is utilized to check that the playback is proceeding properly. If the preliminary Coe signal is not received within a short predetermined period following initiation of the operation of playback circuit means 156, further operation of playback circuit means 156 is prevented.

The closure of contacts 4PB3 causes off normal relay 11ONR to be operated over a connection extending from ground through operated contacts 4PB3 and the operating winding of off normal relay 11ONR to grounded battery, thereby closing normally open contacts 11ONR2 thereof. The closure of contacts 11ONR2 provides, as previously described, an energizing path for end of call relay 11EC, which, therefore, also operates.

Playback circuit means 156, in controlling the playback of the recorded information on the magnetic tape, times the interval between the end of one call and the beginning of the next call. If this timing interval expires, indicating that there are no further calls on the tape, playback circuit means 156 is effective in controlling playback motor to drive the magnetic tape home at high speed.

This causes the first, second and third perforations on the tape to be sequentially contacted by tape control contacts 13TCC, thereby sequentially operating first, second and third perforation relays 9TA, 13TB and 13TD respectively, in the manner previously described, with the exception that now holding ground for these relays is extended through operated contacts 4CS2 and 4CS4, rather than contacts 8HM6 or 4PB5.

In response to the operation of third perforation relay 13TD, normally closed contacts 13TD1 are opened, removing one source of ground from the previously described connection to conductor C.

The opening of contacts 12TD1 breaks the previously described energizing path for clutch switch slave relay 4CSS. However, clutch switch slave relay 4CSS is slow to release, so that contacts 4CSS3 thereof remain operated, thereby removing the other source of ground on conductor C. Therefore, ground is removed from conductor C.

In response to the removal of ground from conductor C, playback circuit means 156 disassociates itself from toll ticketing adapter 120, removing ground potential from the CS conductor. The removal of ground from the CS conductor breaks the energizing path for camp relay 4CA, which then restores.

The restoration of camp relay 4CA causes contacts 5CA1 thereof to be reopened, thereby breaking the holding circuit for clutch switch relay 5CS, which then also restores.

Clutch switch slave relay 4CSS, which was previously deenergized, now restores, so that the holding circuit for playback relay 5PB, through any one of contacts 5CS4, 5CSS1, and 13TD4, is now broken. Therefore, playback relay 5PB restores.

In restoring, playback relay 5PB reopens contacts 4PB3 thereof, breaking the previously described energizing path for off normal relay 11ONR, which then restores.

In response to the restoration of off normal relay 11-ONR, end of call relay 11EC in cooperation with pulse generator relay 11PG and Coe relay 10COE record a preliminary Coe signal on the magnetic tape, and then provide a tape run off, in the same manner as previously described in connection with the recording of items of billing information of a call, after which end of call relay 11EC finally restores.

The previously described restoration of camp relay 4CA causes contacts 4CA thereof to be reopened, removing one source of ground from conductor S3, which was applied thereto over a previously described connection. However, since at this time end of call relay 11EC is operated, contacts 10EC1 thereof maintain marking ground on conductor S3 until end of call relay 11EC finally restores. After the restoration of end of call relay 11EC, the playback cycle of toll ticketing adapter 120 is complete, and toll ticketing adapter 120 is back in its initial state ready to be seized by a calling subscriber.

In addition to the routine playback of toll ticketing adapter 120, just described, toll ticketing adapter 120 may be individually played back by operating the individual playback switch shown in Fig. 5. In response to this switch being operated, contacts 5IPB1 thereof are closed to provide an energization path for homing relay 9HM extending from ground through normally closed contacts 5ALM2, operated contacts 5IPB1, the operating winding of homing relay 9HM to grounded battery. In response to the operation of homing relay 9HM, the magnetic tape is homed in the manner previously described in connection with a routine playback.

The opening of contacts 8HM7 breaks the connection between conductor EMB of cable 160 and the C conductor, to mark the C conductor with absence of ground. The closure of contacts 8HM3 applies ground to the emergency start conductor EST of cable 160 over a connection extending from ground through normally closed contacts 3RDS2 and operated contacts 8HM3 to conductor EST. The presence of ground on conductor EST causes playback circuit means 156 to start searching for the toll ticketing adapter having an absence of ground on its C conductor, thereby seizing toll ticketing adapter 120.

In response to playback circuit means 156 seizing toll ticketing adapter 120, ground is applied to conductor CS, thereby operating camp relay 4CA as previously described. The operation of camp relay 4CA closes contacts 5CA1, resulting in the operation of clutch switch relay 5CS, as previously described. From this point on, the operation of toll ticketing adapter 120 on individual playback is identical to the operation thereof on routine playback.

Should the magnetic tape not be homed during the previously described 2 to 4 minute timing interval, or should the erase path open, or should the short timing interval, which takes place after the tape has been homed prior to playback, and while awaiting the preliminary Coe signal, be exceeded, ground is applied over alarm conductor ALM of conductor 160 through contacts 5CS5, which are operated at this time, through the operating winding of alarm relay 5ALM, thereby operating this relay. Since the alarm relay does not form part of this invention, the operation thereof will not be described in detail. However, briefly, in response to the alarm relay 5ALM operating, a holding ground is applied thereto through operated contacts 5ALM4. This holding ground may only be removed by manual operation of release key contacts 5RL. The operation of alarm relay 5ALM causes alarm lamp 5ALM to be energized; marking ground to be applied to conductor S3, so that toll ticketing adapter 120 cannot be subsequently seized by a calling subscriber; ground to be applied to the C conductor, to mark toll ticketing adapter 120 as busy to play back control circuit means 156 on subsequent playback cycles; the operating ground for homing relay 9HM to be removed; resistance ground to be placed on the ALR conductor of cable 160; and the circuit to pulse generator relay PG to be opened, to prevent run off and the preliminary Coe signal from being recorded on the magnetic tape, since the magnetic tape has not been played back.

Monitor lamp 3L is also utilized during playback. The opening of normally closed contacts 8HM1 and the closure of normally open contacts 8HM2, in response to the operation of homing relay 9HM, causes monitor lamp 3L to be energized over a path extending from "MON120IPM" conductor, shown in Fig. 4, which has pulsing ground applied thereto, operated contacts 8HM2, normally closed contacts 3RDS5, resistor 3R1, monitor lamp 3L to grounded battery, so that monitor lamp 3L, due to resistor 3R1 connected in series therewith, flashes dim during the homing of the magnetic tape. In response to the operation of playback relay 5TB, during actual playback, an energizing path from monitor lamp 3L is established from conductor "MON120IPM" through operated contacts 4PB1, normally closed contacts 3RDS5, normally closed contacts 8HM1 and 7SR2, and monitor lamp 3L to grounded battery, so that monitor lamp now flashes bright, since resistor 3R1 is shunted by normally closed contacts 8HM1 and SR2.

Although a preferred embodiment of the present invention has been described above, it should be understood that many other modifications and embodiments may be provided by those skilled in the art which fall within the spirit and scope of the principles of the present invention, and therefore the present invention is to be limited only by the claims appended hereto.

What is claimed is:

1. A telephone system comprising a trunk circuit having a plurality of points of access and including a first busy marking conductor which has a given potential condition placed thereon in response to said trunk circuit being busy, a toll ticketing adapter having a data storage means associated therewith and having access to said trunk circuit over a particular one of said points of access of said trunk circuit and including a second busy marking conductor which has said given potential condition placed thereon in response to said adapter being busy, means interconnecting said first and second busy marking conductors for placing said given potential condition on said second busy marking conductor in response to said first busy marking conductor having said given potential condition thereon but preventing the placement of said given potential condition on said first busy marking conductor in response to said second busy marking conductor having said given potential thereon, a calling subscriber line having access to said toll ticketing adapter for seizing said adapter in response to said second busy marking conductor not having said given potential condition thereon, and means connectable to said adapter independent of the presence of said given potential condition on said second busy marking conductor for rendering said adapter busy when connected thereto and including means for playing back stored information through said toll ticketing adapter.

2. The telephone system defined in claim 1 wherein said means interconnecting said first and second busy marking conductors includes a unidirectional conducting device connected to allow conduction from said trunk circuit to said adapter.

3. The telephone system defined in claim 2 wherein said given potential condition is ground potential.

4. A telephone system comprising first means having a plurality of points of access and including a first busy marking conductor which has a given potential condition placed thereon in response to said first means being busy, second means having access to said first means over a particular one of said points of access of said first means and including a second busy marking conductor which has said given potential condition placed thereon in response to said second means being busy, third means interconnecting said first and second busy marking conductors and including a unidirectional conducting device connected to allow conduction from said first means to said second means for placing said given potential condition on said second busy marking conductor in response to said first busy marking conductor having said given potential condition thereon but preventing the placement of said given potential condition on said first busy marking conductor in response to said second busy marking conductor having said given potential condition thereon, and fourth means for seizing said second means in response to said second busy marking conductor not having said given potential condition thereon.

References Cited in the file of this patent

UNITED STATES PATENTS

| | | |
|---|---|---|
| 2,782,257 | Blashfield | Feb. 19, 1957 |
| 2,794,070 | Ostline | May 28, 1957 |
| 2,848,543 | Breed et al. | Aug. 19, 1958 |